(12) United States Patent
Sanji et al.

(10) Patent No.: US 10,328,901 B2
(45) Date of Patent: *Jun. 25, 2019

(54) USER IDENTIFICATION SYSTEM AND VEHICULAR PORTABLE DEVICE

(71) Applicant: DENSO CORPORATION, Kariya, Aichi-pref. (JP)

(72) Inventors: Kenichiro Sanji, Kariya (JP); Noritaka Hirao, Kariya (JP); Suguru Matsushita, Kariya (JP); Takatoshi Sekizawa, Kariya (JP); Yasuhiro Tanaka, Kariya (JP); Mitsugi Ohtsuka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/560,616

(22) PCT Filed: Mar. 10, 2016

(86) PCT No.: PCT/JP2016/001324
§ 371 (c)(1),
(2) Date: Sep. 22, 2017

(87) PCT Pub. No.: WO2016/152061
PCT Pub. Date: Sep. 29, 2016

(65) Prior Publication Data
US 2018/0050662 A1 Feb. 22, 2018

(30) Foreign Application Priority Data
Mar. 25, 2015 (JP) .................. 2015-063289

(51) Int. Cl.
*B60R 25/24* (2013.01)
*B60R 25/33* (2013.01)
(Continued)

(52) U.S. Cl.
CPC ........ *B60R 25/241* (2013.01); *B60R 25/2081* (2013.01); *B60R 25/33* (2013.01);
(Continued)

(58) Field of Classification Search
CPC ... B60R 16/02; B60R 25/24; B60R 2323/205; B60R 2325/103; B60R 25/241;
(Continued)

(56) References Cited

U.S. PATENT DOCUMENTS 9,055,450 B2 * 6/2015 Hand .................... H04W 24/00
9,980,085 B2 * 5/2018 Yonezawa ............ H04B 17/318
(Continued)

FOREIGN PATENT DOCUMENTS

JP 2010248709 A 11/2010
JP 2011026768 A 2/2011

OTHER PUBLICATIONS

U.S. Appl. No. 15/556,526, filed Sep. 7, 2017, Denso Corporation.
(Continued)

*Primary Examiner* — Yong Hang Jiang
(74) *Attorney, Agent, or Firm* — Harness, Dickey & Pierce, P.L.C.

(57) ABSTRACT

A user identification system is provided, which includes an in-vehicle apparatus used by multiple users and a vehicular portable device carried by a user acting as a driver and associated with the in-vehicle apparatus. The vehicular portable device detects received signal strength of signals received from the portable terminals at multiple time points, and based on the received signal strength detected by the received signal strength detector, determines a driver terminal which is the portable terminal carried by the user acting as the driver. The vehicular portable device determines as the driver terminal the portable terminal that provides a smallest degree of change of the received signal strength detected multiple times.

14 Claims, 7 Drawing Sheets

(51) Int. Cl.
*H04B 17/318* (2015.01)
*B60R 25/20* (2013.01)

(52) U.S. Cl.
CPC .......... *H04B 17/318* (2015.01); *B60R 25/245* (2013.01); *B60R 2325/103* (2013.01)

(58) Field of Classification Search
CPC ......... B60R 25/245; B60R 25/33; G01S 3/16; H04B 17/31
See application file for complete search history.

(56) References Cited

U.S. PATENT DOCUMENTS

2008/0204192 A1* 8/2008 Hamamura ......... B60R 25/2072
340/5.72
2011/0082625 A1* 4/2011 Miller ..................... B60R 25/00
701/45

OTHER PUBLICATIONS

Kappamaru, Report of Tokyo Motor Show 2013, URL: <http://s-max.jp/archives/1592589.html>.

* cited by examiner

USER IDENTIFICATION SYSTEM AND VEHICULAR PORTABLE DEVICE

CROSS REFERENCE TO RELATED APPLICATIONS

This application is a U.S. National Phase Application under 35 U.S.C. 371 of International Application No. PCT/JP2016/001324 filed on Mar. 10, 2016 and published in Japanese as WO 2016/152061 A1 on Sep. 29, 2016. This application is based on and claims the benefit of priority from Japanese Patent Application No. 2015-063289 filed on Mar. 25, 2015. The entire disclosures of all of the above applications are incorporated herein by reference.

TECHNICAL FIELD

The present disclosure relates to a user identification system to specify a user acting as a driver and a vehicular portable device.

BACKGROUND ART

There is known a system which performs various kinds of controls, such as lock/unlock of a vehicle door and an engine start, based on collation effectuated by the wireless communication between an in-vehicle apparatus mounted to a vehicle and a vehicular portable device carried by a user and associated with the in-vehicle apparatus.

Patent Literature 1 discloses a system (referred to as a user identification system) that identifies a user who is going to get into the vehicle, utilizing the system described above and that performs automatically the setup change of cabin environments, such as a seat position, to the cabin environments that were set up in advance uniquely for the user.

In the user identification system according to Patent Literature 1, user information for the in-vehicle apparatus to specify the user is registered in advance in a portable terminal (for example, a mobile-phone) of the user. Then, when the user having both the vehicular portable device and the portable terminal enters the wireless communication area of the in-vehicle apparatus, the vehicular portable device acquires the user information from the portable terminal by human body communication, and transmits the acquired user information to the in-vehicle apparatus. The in-vehicle apparatus specifies the user based on the user information received from the vehicular portable device, and performs the setup change of the cabin environments to the environments corresponding to the user's preference.

Patent Literature 1 further discloses, as a modification, that the near field communications with a communication range of about several centimeters may be employed for the communications with the vehicular portable device and the portable terminal. Anyway, it is assumed in the configuration that only one mobile phone exists in the communicable range with the vehicular portable device.

PRIOR ART LITERATURES

Patent Literature

Patent Literature 1: JP2011-26768A

SUMMARY OF INVENTION

In the configuration of Patent Literature 1, when the user carrying both the vehicular portable device and the portable terminal enters the wireless communication area of the in-vehicle apparatus, the cabin environments can be automatically changed to the environments corresponding to the user's preference.

However, both the portable terminal and the vehicular portable device may not be always carried in a human body communication performable manner. Further, when the portable terminal and the vehicular portable device communicate with each other by the near field communications with the communication range of about several centimeters, the communication is difficult when one of the portable terminal and the vehicular portable device is stored in a bag and the other is worn by the user, for example.

For addressing this issue, a conceivable configuration (referred to as a first conceivable configuration) is that the vehicular portable device and the portable terminal communicate by short range wireless communication with a communication range of about tens of meters at the maximum and relatively wider than the human body communication and the near field communications. However, when the short range wireless communication is employed for the communication between the vehicular portable device and the portable terminal, it is supposed that the vehicular portable device detects portable terminals carried by users other than the driver, in addition to the portable terminal carried by the driver. In such a case, it becomes difficult for the vehicular portable device to identify which portable terminal is the portable terminal carried by the driver.

Therefore, a second assumption configuration is that when multiple portable terminals are detected, a portable terminal transmitting a signal causing the highest received signal strength is determined as the portable terminal carried by the driver. This is reasoned based on the following expectation. That is, the portable terminal carried by the driver and the vehicular portable device exist in a relatively close position; accordingly, for the vehicle portable device, the signal transmitted from the portable terminal carried by the driver produces a higher received signal strength than the signal transmitted from the portable terminal carried by users other than the driver.

However, the received signal strength of the signal transmitted from the portable terminal at the position of the vehicular portable device is subject to not only the influence of distance but also the influence of various factors, such as reflection and attenuation of the radio wave due to the human body or the peripheral environment. Accordingly, the portable terminal transmitting a signal causing the highest received signal strength is not necessarily the portable terminal carried by the driver.

That is, in the second assumption configuration, there is concern about the possibility that the portable terminal carried by users other than the driver is erroneously determined as the portable terminal carried by the driver. When the determination of the portable terminal carried by the driver is erroneously made, the in-vehicle apparatus will recognize the user who is not the driver as a driver.

The present disclosure is made in view of the above, and has an object to provide a user identification system and a vehicular portable device that can specify a driver with a higher degree of accuracy, even when there exist multiple portable terminals around the vehicular portable device.

A user identification system in an example of the present disclosure comprises: an in-vehicle apparatus mounted to a vehicle used by a plurality of users; and a vehicular portable device carried by a user acting as a driver among the users and associated with the in-vehicle apparatus. The in-vehicle apparatus includes a vehicle apparatus-side communicator that communicates with the vehicular portable device. The vehicular portable device includes: a first communicator that communicates with the in-vehicle apparatus; a second communicator that performs a short range wireless communication with portable terminals carried by the users; a received signal strength detector that detects received signal strength of signals received by the second communicator from the portable terminals; and a driver terminal determiner that, based on the received signal strength detected by the received signal strength detector, determines a driver terminal which is the portable terminal carried by the user acting as the driver. The received signal strength detector detects the received signal strength of the signals received from the portable terminal at a plurality of time points. The driver terminal determiner determines as the driver terminal the portable terminal that provides a smallest degree of change of the received signal strength detected multiple times.

In the above configuration, the vehicular portable device detects the received signal strength of the signals received from the portable terminal at multiple time points, and determines that the driver terminal is the portable terminal that provides the smallest degree of change of the received signal strength detected multiple times.

Generally, the user who carries the vehicular portable device is a user who acts as a driver. The driver terminal as the portable terminal carried by the user acting as the driver and the vehicular portable device are carried by the same person. Accordingly, change of the propagation environment in the process of the radio wave transmitted from the driver terminal and received by the vehicular portable device is relatively small.

Accordingly, the time change of the received signal strength when the vehicular portable device receives the signal transmitted from the driver terminal becomes relatively small. The propagation environment here refers to the presence or absence of the factor such as a human body that attenuates the signal strength, the presence or absence of the reflecting object that reflects the radio wave, and the positional relationship between those objects with the portable terminal and the vehicular portable device.

By contrast, the propagation environment in the process of the radio wave transmitted from the portable terminal carried by occupants other than the driver and received by the vehicular portable device is varied relatively easily. Therefore, the time change of the received signal strength when the vehicular portable device receives the signal transmitted from the portable terminal carried by the occupants other than the driver becomes relatively large.

That is, the portable terminal determined as the driver terminal by the above configuration has a high possibility of being the driver terminal truly.

As described above, the signal transmitted from the portable terminal is attenuated under the influence of various factors. Therefore, it is conceivable that the received signal strength of the signal transmitted from the portable terminal carried by users other than the driver becomes temporarily greater than the received signal strength of the signal transmitted from the driver terminal.

The second assumption configuration described above in such a case may erroneously determine the portable terminal carried by users other than the driver as the driver terminal. By contrast, the user identification system having the above-described configuration determines that the portable terminal providing the smallest degree of change of the received signal strength is the driver terminal. That is, the magnitude relation of the instantaneous received signal strength is not important in determining the driver terminal, and what is relatively important is whether the constant received signal strength is maintained.

Consequently, in the user identification system described above, even if the received signal strength of the signal transmitted from the portable terminal carried by users other than the driver is larger than the received signal strength of the signal transmitted from the driver terminal, it is possible to suppress to determine erroneously the portable terminal carried by users other than the driver as the driver terminal.

That is, in the configuration described above, it is possible to specify the portable terminal carried by the driver with a higher degree of accuracy. Consequently, it is possible to specify the driver with a higher degree of accuracy.

A vehicular portable device in an example of the present disclosure is associated with an in-vehicle apparatus mounted to a vehicle used by a plurality of users and comprises: a first communicator (220) that communicates with the in-vehicle apparatus; a second communicator (230) that performs a short range wireless communication with portable terminals carried by the users; a received signal strength detector (233) that detects received signal strength of signals received by the second communicator from the portable terminal; and a driver terminal determiner (G4) that, based on the received signal strength detected by the received signal strength detector, determines a driver terminal which is the portable terminal carried by the user acting as a driver. The received signal strength detector detects the received signal strength of the signals received from the portable terminal at a plurality of time points. The driver terminal determiner determines the portable terminal providing a smallest degree of change of the received signal strength detected multiple times as the driver terminal.

This vehicular portable device corresponds to the vehicular portable device used by the user identification system described above. That is, in the above configuration, it is possible to produce the effect similar to that of the user identification system described above.

BRIEF DESCRIPTION OF DRAWINGS

The above and other objects, features and advantages of the present invention will become more apparent from the following detailed description made with reference to the accompanying drawings. In the accompanying drawings.

EMBODIMENTS FOR CARRYING OUT INVENTION

Embodiment 1

Figure 1:
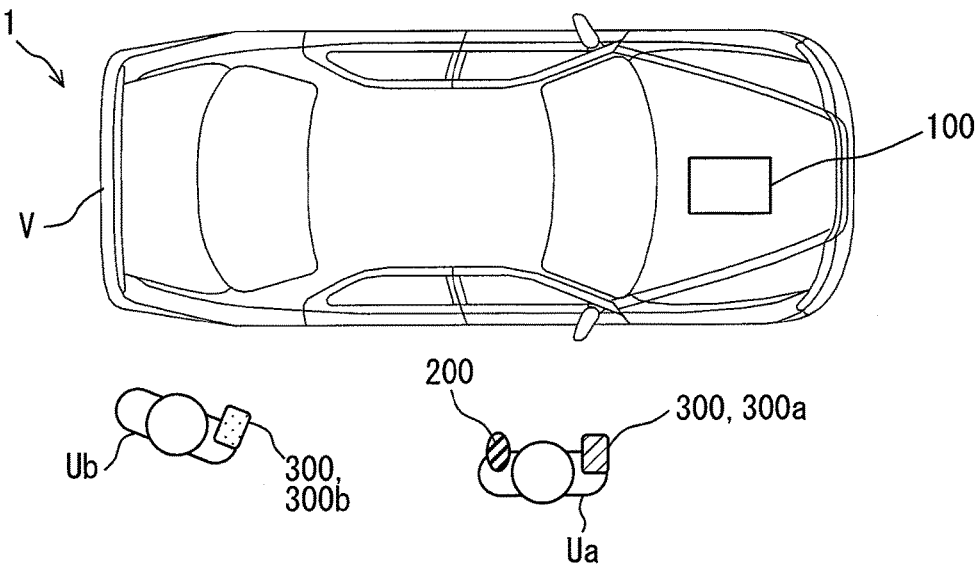
FIG. 1 is a conceptual diagram illustrating an embodiment of a user identification system 1.

Hereinafter, Embodiment 1 is explained using drawings. FIG. 1 is a conceptual diagram for explaining the outline of a user identification system 1. As illustrated in FIG. 1, the user identification system 1 includes an in-vehicle apparatus 100 mounted to a vehicle V, a vehicular portable device 200 provided with the function as a unique key to the vehicle V, and multiple portable terminals 300a and 300b carried by each of multiple users Ua and Ub.

The user here is a person who is registered in the in-vehicle apparatus 100 in advance as a user of the vehicle V. Only two users are shown in FIG. 1 as an example; however, the number of the users of the vehicle V may be three or more. The vehicular portable device 200 is carried by the user Ua. Hereinafter, when the portable terminal 300a and the portable terminal 300b are not distinguished each other, they are denoted as a portable terminal 300. In the present embodiment, it is assumed that a driver's seat of the vehicle V is provided on the right-hand side of a front seat.

<An Overall Rough Configuration>

The in-vehicle apparatus 100 and the vehicular portable device 200 have the function of realizing a well-known smart entry system, by respectively performing wireless communications with the use of a radio wave in a predetermined frequency band.

Specifically, the vehicular portable device 200 has the function of receiving a signal in a predetermined frequency band transmitted from the in-vehicle apparatus 100 and of transmitting back a signal in a predetermined frequency band to the in-vehicle apparatus 100. The in-vehicle apparatus 100 transmits a signal in a predetermined frequency band to the vehicular portable device 200 and receives a signal in a predetermined frequency band transmitted from the vehicular portable device 200.

Here, it is assumed that a radio wave in the LF (Low Frequency) band is employed for transmitting a signal from the in-vehicle apparatus 100 to the vehicular portable device 200, and that a radio wave in the UHF (Ultra High Frequency) band is employed for transmitting a signal from the vehicular portable device 200 to the in-vehicle apparatus 100. Here, for example, the LF band indicates 30 kHz to 300 kHz and the UHF band indicates 300 MHz to 3 GHz.

Then, the in-vehicle apparatus 100 performs collation processing by wireless communication with the vehicular portable device 200, and executes the various kinds of control for locking/unlocking of a door and for engine starting, after confirming that the collation has been established. Accordingly, the user Ua carrying the vehicular portable device 200 can perform the locking/unlocking of a door and the starting/stopping of an engine for example, without operating the vehicular portable device 200 as the key.

The communication range of the in-vehicle apparatus 100 (referred to as a vehicle communication range) may be properly designed so that the in-vehicle apparatus 100 can detect the vehicular portable device 200, even when the user Ua approaches the vehicle V from any direction. For example, the vehicle communication range is set as the range of less than several meters from the vehicle V.

Figure 4:
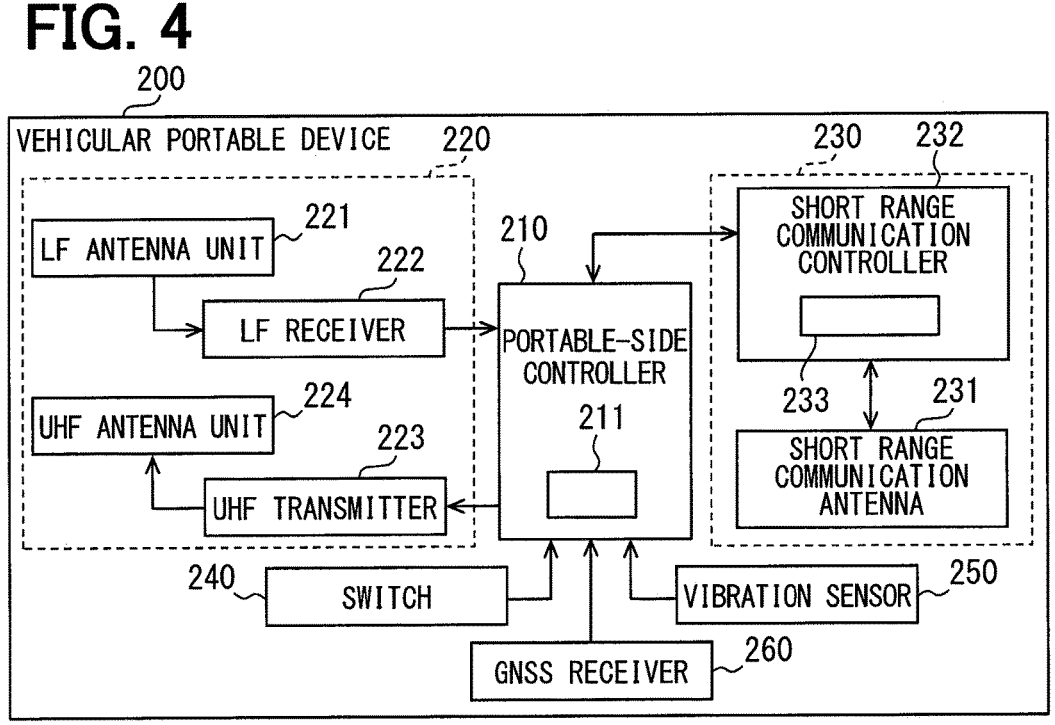
FIG. 4 is a block diagram illustrating a rough configuration of a vehicular portable device.

The vehicular portable device 200 includes a switch 240 to be operated by the user (refer to FIG. 4). The vehicular portable device 200 has the so-called remote keyless entry function that executes the control of the locking/unlocking of a vehicle door, by transmitting a signal corresponding to the switch operated by the user to the in-vehicle apparatus 100. In this way, the vehicular portable device 200 functions as a key of the vehicle V.

The portable terminal 300 is a communication device having the function to perform communication in conformity with the predetermined short range wireless communication standard (referred to as the short range communication) of which the communication range is about tens of meters at the maximum for example. The portable terminal 300 is only necessary to have the short range communication function as described above, and mobile phones such as Smartphone, for example, can be employed as the portable terminal 300. Of course, the portable terminal 300 may be a tablet terminal, a wearable device, a portable music player, or a portable game machine.

The short range wireless communication standard here may adopt Bluetooth Low Energy (Bluetooth is a registered trademark), Wi-Fi (a registered trademark), or ZigBee (a registered trademark), for example.

The vehicular portable device 200 also has the short range communication function described above. The vehicular portable device 200 detects the portable terminal 300 existing in the range in which the short range communication is possible for the self unit (referred to as the short range communication range), and performs the short range communication with the detected portable terminal 300. Herein, the self unit refers to the vehicular portable device 200. The portable terminal 300 transmits a notification signal including a unique identification code (referred to as the terminal ID) assigned to itself, periodically or responding to a request from the vehicular portable device 200. Consequently, the portable terminal 300 notifies the vehicular portable device 200 of the own existence.

Here, it is assumed as an example that the vehicular portable device 200 acts as a master for the portable terminal 300 and the portable terminal 300 acts as a slave for the vehicular portable device 200. Then, the portable terminal 300 transmits a notification signal periodically at the predetermined cycle (referred to as a notification cycle) to notify the vehicular portable device 200 of the own existence.

It is assumed that the portable terminals 300a and 300b illustrated in FIG. 1 both exist in the short range communication range of the vehicular portable device 200. Naturally, the number of the portable terminals 300 that may exist in the short range communication range of the vehicular portable device 200 is not restricted to two sets.

<An Outline of Operation of the User Identification System 1>

The user identification system 1 according to the present embodiment operates roughly as follows. First, the vehicular portable device 200 specifies a portable terminal (referred to as a driver terminal) carried by a user who acts as a driver, based on the received signal strength of a signal received from the portable terminal 300 existing in the periphery of the self unit. The periphery of the self unit indicates the inside of the short range communication range.

Then, the vehicular portable device 200 transmits to the in-vehicle apparatus 100 the driver information determined by the terminal ID of the portable terminal 300 specified as the driver terminal. The driver information is information for the in-vehicle apparatus 100 to specify or recognize the user who acts as the driver in this driving among the users of the vehicle V. This driver information corresponds to the driver terminal-related information. Here, as an example, the vehicular portable device 200 transmits the terminal ID of the portable terminal 300 specified as the driver terminal to the in-vehicle apparatus 100 as the driver information.

User management data is stored in the in-vehicle apparatus 100 in advance. The user management data associates the user of the vehicle V with the terminal ID of the portable terminal 300 carried by the user and with the vehicle setup data indicative of the user-specific setup to the vehicle V (for example, the seat position). The user of the vehicle V may be distinguished by the user ID that is assigned for each user individually.

When the in-vehicle apparatus 100 acquires the driver information from the vehicular portable device 200, the in-vehicle apparatus 100 refers to the user management data and determines as the driver the user corresponding to the terminal ID included in the acquired driver information.

Then, the in-vehicle apparatus 100 refers to the vehicle setup data corresponding to the driver, and performs automatically the setup change of the cabin environments such as a seat position for example, to the cabin environments corresponding to a driver's preference. The driver information corresponds to an example of the driver terminal-related information. Hereinafter, the concrete configuration and operation of each factor are described.

<A Configuration of the in-Vehicle Apparatus 100>

Figure 2:
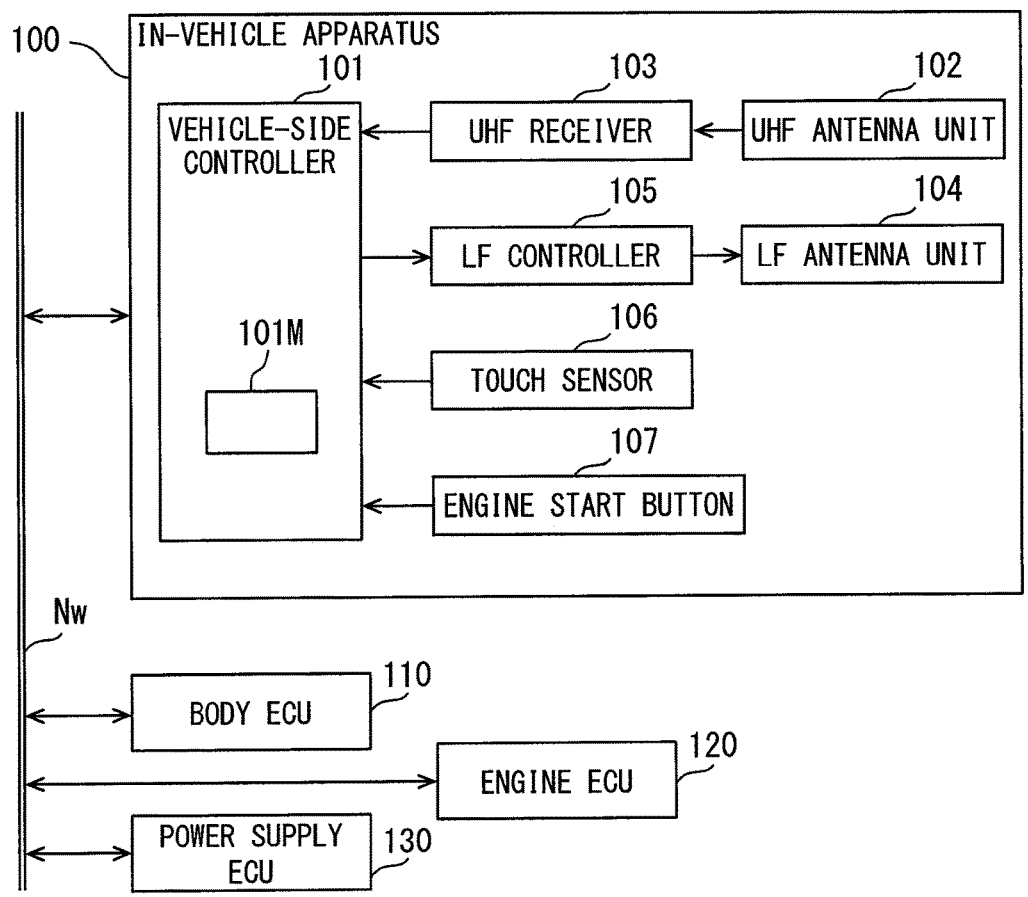
FIG. 2 is a block diagram illustrating a rough configuration of an in-vehicle apparatus.

The in-vehicle apparatus 100 is mounted to the vehicle V, and is coupled to and mutually communicates with various ECUs (Electronic Control Unit) via in-vehicle network Nw, as illustrated in FIG. 2. For example, the in-vehicle apparatus 100 communicates with each of a body ECU 110, an engine ECU 120, and a power supply ECU 130, via the in-vehicle network Nw.

The body ECU 110 is an ECU that controls various actuators (not shown) mounted to the vehicle V. For example, the body ECU 110 outputs a driving signal for controlling the lock/unlock of a door provided in the vehicle V to a door lock motor provided in each vehicle door, to perform the lock/unlock of each door. A courtesy switch concerning each door is coupled to the body ECU 110, and detects the opening and closing of each door. In addition, an occupant detection sensor that detects the presence of an occupant in a driver's seat is coupled to the body ECU 110, and detects whether an occupant is in the driver's seat. As an example of the occupant detection sensor, the well-known sitting sensor provided in the driver's seat can be employed.

The engine ECU 120 is an ECU that controls the operation of an engine (not shown) mounted to the vehicle V. Here, the vehicle V is assumed to be a vehicle provided with an engine as a driving power source; however, the vehicle V is not restricted to this. The vehicle V may be an electric vehicle or a hybrid vehicle.

The power supply ECU 130 controls the power supply to various kinds of electrical components in the vehicle. The power supply ECU 130 supplies the electric power to various kinds of electrical components, when a signal to permit the power supply to various kinds of electrical components in the car is acquired from the in-vehicle apparatus 100, for example.

The in-vehicle apparatus 100 includes a vehicle-side controller 101, a UHF antenna unit 102, a UHF receiver 103, an LF antenna unit 104, an LF controller 105, a touch sensor 106, and an engine starting button 107. The UHF receiver 103 and the LF controller 105 correspond to the vehicle apparatus-side communicator. The vehicle-side controller 101 is coupled to and communicates with the UHF receiver 103, the LF controller 105, the touch sensor 106, and the engine starting button 107.

The UHF antenna unit 102 converts a radio wave in the UHF band into an electrical signal, and outputs the electrical signal to the UHF receiver 103. The UHF antenna unit 102 may be provided in the position properly designed in the vehicle V. The UHF receiver 103 demodulates the signal inputted from the UHF antenna unit 102 and provides the demodulated signal to the vehicle-side controller 101.

The LF antenna unit 104 is a module that converts a signal inputted from the LF controller 105 into a radio wave in the LF band, and radiates the radio wave to space. This LF antenna unit 104 is provided in several places properly designed in the vehicle V. For example, the LF antenna unit 104 is provided near a door handle of each door of the vehicle V, near a trunk door, and in the predetermined position in the cabin.

The LF controller 105 generates a signal by modulating a carrier signal by a baseband signal inputted from the vehicle-side controller 101. Then, the modulated signal is outputted to each LF antenna unit 104 and is transmitted.

The touch sensor 106 is mounted on each door handle of the vehicle V and detects that the user touches the door handle. The detection result of each touch sensor 106 is successively outputted to the vehicle-side controller 101. The engine starting button 107 is a push switch for the user to start the engine. When a push operation is performed by the user, the engine starting button 107 outputs a control signal indicative of the push operation to the vehicle-side controller 101.

The vehicle-side controller 101 is configured of a microcomputer as a core that includes a CPU, a ROM, a flash memory, a RAM, and an I/O, and executes various kinds of processing by executing a control program stored in the ROM. For example, the vehicle-side controller 101 executes the processing for realizing a smart entry system.

A storage unit 101M included in the vehicle-side controller 101 is realized by a nonvolatile storage medium such as a flash memory. The storage unit 101M stores the user management data as the data that associates the user of the vehicle V with the terminal ID of the portable terminal 300 carried by the user and with the vehicle setup data indicative of a user's unique setup to the vehicle V.

Items as the target of the user's unique setup are items composing cabin environments, such as a seat position, the angle of a cabin mirror and a rearview mirror, and an air-conditioning temperature. When the vehicle V has the function (welcome illuminating function) to turn on the illuminations provided inside and outside the cabin, triggered by the detection of boarding or boarding preparatory action of the driver, the color of the illuminations may be chosen as an item that the user can set up. Furthermore, a different setup for each user may be made also to a vehicle navigation system.

Figure 3:
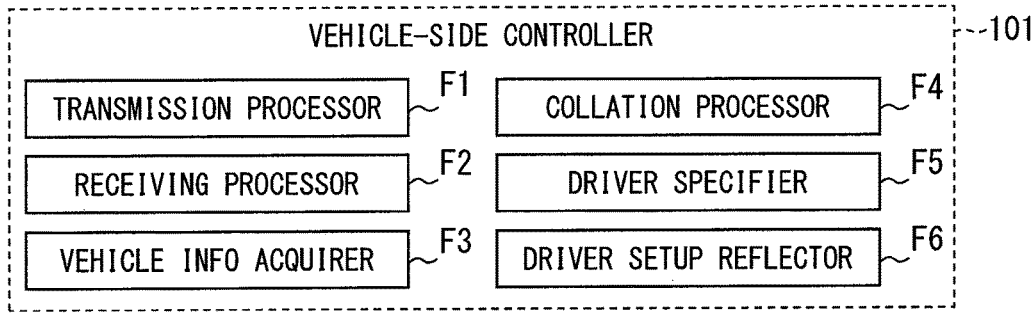
FIG. 3 is a block diagram illustrating a rough configuration of a vehicle-side controller.

As functional blocks realized by executing the program described above, this vehicle-side controller 101 includes, as illustrated in FIG. 3, a transmission processor F1, a receiving processor F2, a vehicle information acquirer F3, a collation processor F4, a driver specifier F5, and a driver setup reflector F6. Some or all of the function that the vehicle-side controller 101 executes may be realized hardware-wise by one or more ICs.

The transmission processor F1 generates a signal to be transmitted from each LF antenna unit 104, outputs the signal to the LF controller 105, and makes each LF antenna unit 104 transmit the signal. The transmitting signal includes a wake signal for causing the vehicular portable device 200 to make a transition from the sleep mode to a startup mode as described below, and a collation request signal for collating the vehicular portable device 200. The collation request signal requests the vehicular portable device 200 to return an ID code generated according to the predetermined rule. Either signal requests the vehicular portable device 200 to return the response signal corresponding to the contents of the signal.

The receiving processor F2 acquires the data that is received at the UHF antenna unit 102 and demodulated by the UHF receiver 103. The vehicle information acquirer F3 acquires various kinds of information (vehicle information) indicative of the state of the vehicle, from sensors or ECUs mounted to the vehicle V, such as the touch sensor 106, the engine starting button 107, the body ECU 110, the engine ECU 120, and the power supply ECU 130.

The vehicle information includes the open/close state of the doors, the locking/unlocking of each door, the detection result of the occupant detection sensor, and the occurrence or non-occurrence of depression of the touch sensor 106 and the engine starting button 107. The vehicle information also includes the shift position detected by a shift position sensor (not shown) and the detection result of a brake sensor (not shown) that detects whether the brake pedal is pushed down.

The collation processor F4 performs collation processing by means of wireless communication with the vehicular portable device 200. The procedure of this collation processing is common knowledge; accordingly, the detailed explanation thereof is omitted here. The collation processor F4 performs the collation processing based on the vehicle information acquired by the vehicle information acquirer F3, when the predetermined user's action necessitating collation processing is detected. For example, the collation processor F4 performs the collation processing, when it is detected that the vehicular portable device 200 has entered the vehicle communication range, or when the engine starting button 107 is pushed.

Whether the vehicular portable device 200 has entered the vehicle communication range may be determined based on the existence or nonexistence of the reply from the vehicular portable device 200 to the wake signal transmitted periodically. That is, when the response signal from the vehicular portable device 200 is received in the state where the state of not receiving the response signal from the vehicular portable device 200 to the wake signal continues, it may be determined that the vehicular portable device 200 has entered the vehicle communication range.

The driver specifier F5 acquires the driver information transmitted from the vehicular portable device 200, and specifies the driver. That is, the user corresponding to the terminal ID indicated in the driver information is recognized as the driver.

The driver setup reflector F6 performs the setup change (the so-called customization) of the environments of the vehicle to the environments corresponding to the driver's preference. For example, the driver setup reflector F6 outputs to the body ECU 110 a signal instructing to move the seat position of the driver's seat to the position set up in advance. The body ECU 110 drives an actuator to adjust the seat position, based on the instructions from the driver setup reflector F6.

<A Configuration of the Vehicular Portable Device 200>

As illustrated in FIG. 4, the vehicular portable device 200 includes a portable device-side controller 210, a vehicle communicator 220, a short range communicator 230, a switch 240, a vibration sensor 250, and a GNSS receiver 260.

The portable device-side controller 210 controls the operation of the vehicular portable device 200. The portable device-side controller 210 is coupled to and communicates with each of the vehicle communicator 220, the short range communicator 230, the switch 240, the vibration sensor 250, and the GNSS receiver 260.

The vehicle communicator 220 is a module for communicating with the in-vehicle apparatus 100, and includes, as elements in the more detailed configuration, an LF antenna unit 221, an LF receiver 222, a UHF transmitter 223, and a UHF antenna unit 224. This vehicle communicator 220 corresponds to the first communicator.

The LF antenna unit 221 converts a radio wave in the LF band into an electrical signal, and outputs the electrical signal to the LF receiver 222. The LF receiver 222 generates data by demodulating the signal inputted from the LF antenna unit 221. The LF receiver 222 provides the data demodulated from the received signal to the portable device-side controller 210.

The UHF transmitter 223 modulates a carrier signal by a baseband signal inputted from the portable device-side controller 210, and outputs the modulated signal to the UHF antenna unit 224. The UHF antenna unit 224 converts the signal inputted from the UHF transmitter 223 into a radio wave in the UHF band, and radiates the radio wave to space.

The short range communicator 230 is a module for performing the short range communication with the portable terminal 300, and includes, as elements in the more detailed configuration, a short range communication antenna unit 231 and a short range communication controller 232. This short range communicator 230 corresponds to the second communicator.

The short range communication antenna unit 231 is an antenna for transmitting and receiving a radio wave in the frequency band (for example, 2.4 GHz band) employed for the short range communication. The short range communication controller 232 demodulates a signal received by the short range communication antenna unit 231 and provide the demodulated signal to the portable device-side controller 210. At the same time, the short range communication controller 232 modulates a signal inputted from the portable device-side controller 210 and outputs the modulated signal to the short range communication antenna unit 231 so as to be transmitted.

The short range communication controller 232 further includes a received signal strength detector 233 that detects the received signal strength of a signal received by the short range communication antenna unit 231. The short range communication controller 232 associates the data demodulated from the received signal with the received signal strength thereof, and provides them to the portable device-side controller 210.

The switch 240 is a switch such as a push switch for receiving the user's operation to the vehicular portable device 200. For example, the user can use the remote keyless entry function to perform the locking/unlocking of the door of the vehicle V by operating (here, pushing) the switch 240. Multiple switches 240 may be included. Here, it is assumed that the switch 240 includes three switches, a switch 240 for locking the door of the vehicle V, a switch 240 for unlocking the door of the vehicle V, and a switch 240 for instructing to determine the driver terminal.

The vibration sensor 250 detects vibration that occurs on the vehicular portable device 200, for example, and may be realized employing the well-known acceleration sensor. The vibration sensor 250 outputs a signal corresponding to the magnitude of the vibration that occurs on the vehicular portable device 200, to the portable device-side controller 210.

The GNSS receiver 260 receives a radio wave from a satellite employed in the GNSS (Global Navigation Satellite System) (referred to as a GNSS satellite), and acquires the information (current-position information) indicative of the current position of the GNSS receiver 260. The current position may be expressed by latitude and longitude, for example. The current-position information acquired by the GNSS receiver 260 is outputted to the portable device-side controller 210. The GNSS satellite corresponds to the positioning satellite.

The portable device-side controller 210 is configured of a microcomputer as a core that includes a CPU, a ROM, a flash memory, a RAM, and an I/O, and executes various kinds of processing by executing the control program stored in the ROM. Some or all of the function that the vehicular portable device 200 executes may be realized hardware-wise by one or more ICs.

The portable device-side storage unit 211 included in the portable device-side controller 210 is realized by a nonvolatile storage medium, such as a flash memory. The portable device-side storage unit 211 stores a portable device ID assigned to the vehicular portable device 200 in order to perform collation with the vehicle V, for example.

Figure 5:
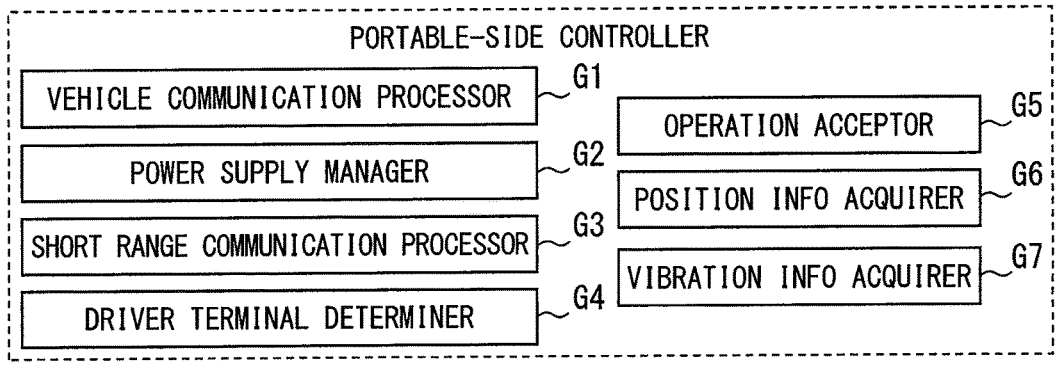
FIG. 5 is a block diagram illustrating a rough configuration of a portable device-side controller.

As the functional blocks realized by executing the program described above, the portable device-side controller 210 includes, as illustrated in FIG. 5, a vehicle communication processor G1, a power supply manager G2, a short range communication processor G3, a driver terminal determiner G4, an operation receiver G5, a position information acquirer G6, and a vibration information acquirer G7.

The vehicle communication processor G1 acquires the data received by the LF receiver 222 via the LF antenna unit 221, and the received signal strength thereof. The vehicle communication processor G1 generates a signal to be transmitted from the UHF antenna unit 224, and outputs the signal to the UHF transmitter 223. That is, the vehicle communication processor G1 performs software processing with regard to communication with the in-vehicle apparatus 100.

As a signal that the vehicle communication processor G1 makes the UHF antenna unit 224 transmit, there is a response signal to the signal received from the in-vehicle apparatus 100. For example, when a collation request signal is received, an ID code that obeys the predetermined rule is generated from the contents of the receive data and the portable device ID, and a signal including the ID code concerned is returned. The vehicle communication processor G1 transmits the driver information when the driver terminal is determined by the driver terminal determiner G4 to be described later.

The power supply manager G2 controls the supply of the electric power to each part from the power supply (not shown) included in the vehicular portable device 200. For example, when the short range communication with the portable terminal 300 does not need to be performed, the power supply manager G2 sets the short range communicator 230 to the low-power consumption mode for suppressing the power consumption in the short range communicator 230. The low-power consumption mode may be set as a mode to stop the electric power supply to whole of the short range communicator 230, or as a mode to suppress the power consumption by supplying the electric power to limited parts. The well-known technology for suppressing the power consumption in the short range communicator 230 may be adopted.

The case where the short range communication with the portable terminal 300 does not need to be performed corresponds, for example, to the case where a predetermined trigger signal is not received from the in-vehicle apparatus 100, and the case where no portable terminal 300 is detected in the periphery of the self unit by the scanning to be described later. For convenience, the state in which the short range communication with the portable terminal 300 is possible is called an active mode as the operation mode of the short range communicator 230.

The operation mode of the vehicular portable device 200 includes a sleep mode for suppressing the power consumption in whole of the vehicular portable device 200, and a startup mode in which the electric power is supplied to relatively more parts than in the sleep mode. In the sleep mode, when the vehicular portable device 200 receives a signal (for example, a wake signal) from the in-vehicle apparatus 100, first of all, the component part relevant to the power supply manager G2 is started, and the power supply manager G2 supplies the electric power to the predetermined functional section, shifting the operation mode to the startup mode. In the sleep mode, when the vehicular portable device 200 receives the user's operation to the switch 240, the operation mode shifts to the startup mode.

The short range communication processor G3 acquires the data received by the short range communication controller 232 via the short range communication antenna unit 231, and the received signal strength thereof. The short range communication processor G3 generates a signal to be transmitted to the portable terminal 300, and outputs the signal to the short range communication controller 232.

The short range communication processor G3 performs the processing (scanning) to detect a portable terminal 300 existing in the periphery of the self unit. For example, in the scanning, the short range communication processor G3 sets the short range communicator 230 to the state where the signal from the portable terminal 300 is allowed to be received only for the period corresponding to the notification cycle. Then, the portable terminal 300 existing in the periphery of the self unit is detected when a notification signal transmitted from the portable terminal 300 is received within the time concerned. The scanning may detect not only the portable terminal 300 but all the communication terminal having the short range communication function, existing in the periphery of the self unit.

The portable terminal 300 detected by the scanning is associated with the received signal strength of the signal from the portable terminal 300 and managed in a list form, for example. The short range communication processor G3 distinguishes the detected portable terminal 300 by a terminal ID included in the notification signal received from the portable terminal 300. The result of the scanning is stored in a volatile memory (RAM) included in the portable device-side storage unit 211 or the portable device-side controller 210.

When the predetermined trigger signal from the in-vehicle apparatus 100 is received, the short range communication processor G3 in the present embodiment performs the scanning successively (for example, every 100 milliseconds) for the predetermined sampling time from the receive time point. The trigger signal here is the collation request signal; however, the trigger signal may be a wake signal in another configuration. When the in-vehicle apparatus 100 transmits an instruction signal to instruct the starting of the scanning separately, the instruction signal may be used as the trigger signal.

The sampling time here is only necessary to have the length during which the driver terminal determiner G4 can determine a driver terminal based on the change of the received signal strength of the signals received from the portable terminal 300 over time, and may be designed suitably. It is preferable to set the sampling time as the length during which the propagation environment of the radio wave for short range communications may change, such as the positional relationship of the driver and the users other than the driver. For example, the sampling time may be set to 5 seconds, 10 seconds, or 20 seconds.

In the above, upon receipt of the predetermined trigger signal from the in-vehicle apparatus 100, the scanning is performed successively (for example, every 100 milliseconds) for the predetermined sampling time from the time point of the receipt. However, this is not limiting. In another configuration, the scanning may be performed successively when the vehicular portable device 200 is in the startup mode.

The driver terminal determiner G4 determines the driver terminal among multiple portable terminals 300, based on the degree of changing with time (the degree of change) of the received signal strength of a signal transmitted from each of the multiple portable terminals 300 existing in the periphery of the self unit. Specifically, the driver terminal determiner G4 calculates, for each portable terminal 300, the distribution value of the received signal strength of a signal received from each portable terminal 300 at multiple time points. The distribution value here is the same as a variance employed in statistics. This distribution value is the degree of change. Then, the portable terminal 300 providing the smallest distribution value as the degree of change is determined as the driver terminal.

In the above, the distribution value determined from the population given by the received signal strength detected at multiple time points is employed as the degree of change. However, this is not limiting. The degree of change may be defined as the difference of the maximum value and the minimum value of the received signal strength detected at multiple time points.

When only one set of the portable terminal 300 exists in the periphery of the self unit and when the received signal strength from the portable terminal 300 is greater than the predetermined threshold, the portable terminal 300 may be determined as the driver terminal. The threshold here is a threshold for discriminating whether the distance between the vehicular portable device 200 and the detected portable terminal 300 is greater than a fixed distance (for example, 5 m). When no portable terminal 300 with the received signal strength greater than the threshold exists in the periphery of the self unit, it may be determined that no driver terminal exists.

When the driver terminal determiner G4 determines the driver terminal, the vehicle communication processor G1 transmits to the in-vehicle apparatus 100 the terminal ID of the driver terminal as the driver information. When the driver terminal determiner G4 determines that no driver terminal exists, the vehicle communication processor G1 may transmit the fact to the in-vehicle apparatus 100.

Based on the control signal inputted from the switch 240, the operation receiver G5 specifies the user's operation to the switch 240, and provides other functional sections with the contents of the operation. Then, each section performs the processing corresponding to the contents of the user's operation specified by the operation receiver G5. For example, when the operation receiver G5 detects that the switch 240 for unlocking the door of the vehicle V has been pushed by the user, the vehicle communication processor G1 transmits the signal to instruct the unlocking of the door to the in-vehicle apparatus 100.

The position information acquirer G6 acquires the position information provided from the GNSS receiver 260. The vibration information acquirer G7 acquires the information about the vibration occurring in the vehicular portable device 200, provided by the vibration sensor 250.

<A Configuration of the Portable Terminal 300>

Figure 6:
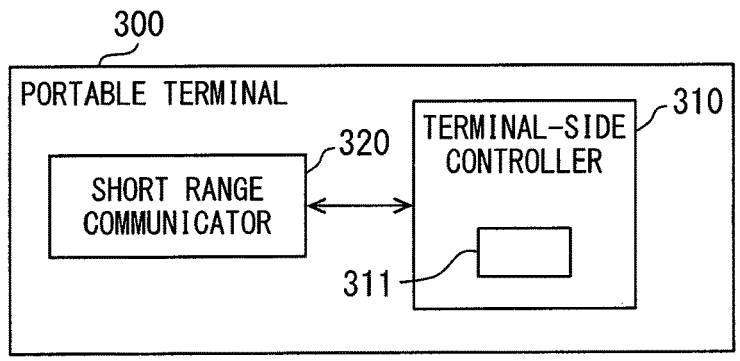
FIG. 6 is a block diagram illustrating a rough configuration of a portable terminal.

The portable terminal 300 is only necessary to have the function to perform the short range communication, as described above, and various kinds of portable terminals, such as Smartphone, can be employed. The rough configuration of the portable terminal 300 is illustrated in FIG. 6. As illustrated in FIG. 6, the portable terminal 300 includes a terminal-side controller 310 and a short range communicator 320. The explanation is omitted about the configurations unnecessary to the explanation of the present embodiment, among the functional configurations included in the general portable terminals, such as Smartphone.

The terminal-side controller 310 is configured of a microcomputer as a core that includes a CPU, a ROM, a flash memory, a RAM, and an I/O, and executes various kinds of processing by executing the control program stored in the ROM. Some or all of the function that the terminal-side controller 310 executes may be realized hardware-wize by one or more ICs.

The storage unit 311 included in the terminal-side controller 310 is realized by a nonvolatile storage medium, such as a flash memory. Various application programs in addition to the terminal ID unique to the portable terminal 300 are stored in the storage unit 311. For example, the storage unit 311 stores the application program for performing communication with the in-vehicle apparatus 100 via the vehicular portable device 200.

The short range communicator 320 is a module for realizing the function for the portable terminal 300 to perform the short range communication with the vehicular portable device 200, and the configuration thereof is the same as that of the short range communicator 230.

<Driver Specification Processing>

The following explains the processing performed by each of the vehicle-side controller 101 of the in-vehicle apparatus 100 and the portable device-side controller 210 of the vehicular portable device 200, in order to specify a driver. For convenience, the processing performed by the vehicle-side controller 101 of the in-vehicle apparatus 100 is called vehicle apparatus-side processing, and the processing performed by the portable device-side controller 210 of the vehicular portable device 200 is called portable device-side processing. The vehicle apparatus-side processing and the portable device-side processing are collectively called driver specification processing.

Figure 7:
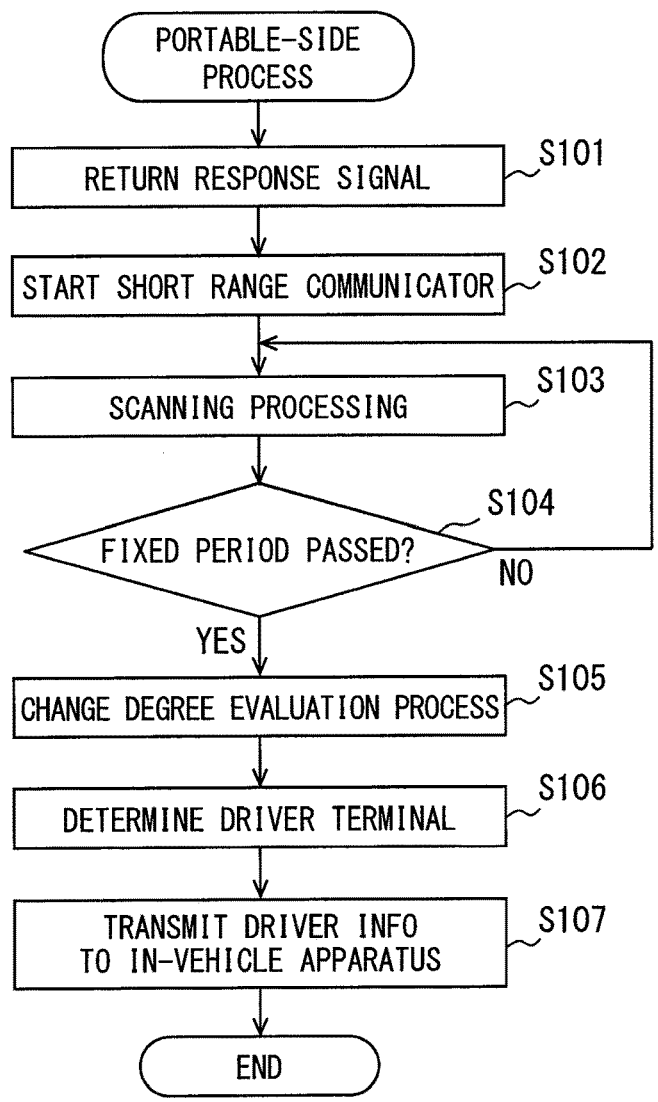
FIG. 7 is a flow chart for explaining portable device-side processing.

First of all, the portable device-side processing is explained with reference to the flow chart illustrated in FIG. 7. The portable device-side processing may be started when a trigger signal (here a collation request signal) is received from the in-vehicle apparatus 100, for example. The conditions to start the portable device-side processing may be designed properly. It is assumed that the short range communicator 230 is in the low-power consumption mode at the start of the present flow.

At first, at Step S101, the vehicle communication processor G1 makes the UHF transmitter 223 transmit a response signal to a trigger signal having triggered the start of the present flow, and the flow moves to Step S102. Here, since the collation request signal is employed as the trigger signal, the signal including the ID code is returned at Step S101.

At Step S102, the power supply manager G2 restores the short range communicator 230 to the active mode from the low-power consumption mode, and the flow moves to Step S103. At Step S103, the short range communication processor G3 performs the scanning, and the flow moves to Step S104. For convenience, the time when the first scanning is performed after starting the present flow is called the sampling start time.

At Step S104, the short range communication processor G3 determines whether the sampling time from the sampling start time has elapsed. When the sampling time from the sampling start time has elapsed, the determination at Step S104 becomes YES and the flow moves to Step S105. When the sampling time from the sampling start time has not elapsed on the other hand, the determination at Step S104 becomes NO, and the flow returns to Step S103 to perform the scanning again.

By repeating Step S103 and Step S104, the scanning is performed successively (every 100 milliseconds, for example) for the predetermined sampling time. That is, when the predetermined trigger signal from the in-vehicle apparatus 100 is received, the short range communication processor G3 performs the scanning successively, in a period of time from the sampling start time set corresponding to the receive time point until the sampling time elapses.

An interval between the previous scanning and the next scanning may be adjusted to the predetermined interval (here 100 milliseconds). For convenience, a series of processing after Step S103 is performed for the first time until the sampling time elapses is called sampling processing. The sampling processing corresponds to the processing in which the scanning is performed multiple times.

At Step S105, the driver terminal determiner G4 performs change degree evaluation processing, and the flow moves to Step S106. The change degree evaluation processing here is the processing in which the degree of change of the received signal strength is calculated for each portable terminal 300 existing in the periphery of the self unit.

That is, in the change degree evaluation processing at Step S105, the distribution value of the received signal strength for each portable terminal 300 is calculated as the degree of change, based on the received signal strength at multiple time points for each portable terminal 300, collected in the course of repeating Step S103 and Step S104. The distribution value of the received signal strength of a certain portable terminal 300 is the distribution value determined from the population given by the received signal strength of a signal received from the portable terminal 300, collected in the course of repeating Step S103 and Step S104.

At Step S106, the driver terminal determiner G4 determines as the driver terminal the portable terminal 300 providing the smallest degree of change of the received signal strength (that is, the smallest distribution value of the received signal strength) calculated at Step S105, and the flow moves to Step S107. At Step S107, the vehicle communication processor G1 transmits the terminal ID of the portable terminal 300 corresponding to the driver terminal determined at Step S106 to the in-vehicle apparatus 100, as the driver information, and the flow is terminated.

Next, the vehicle apparatus-side processing is explained with reference to the flow chart illustrated in FIG. 8. The vehicle apparatus-side processing may be started when it is detected that the vehicular portable device 200 has entered into the vehicle communication range, for example. The conditions to start the vehicle apparatus-side processing may be designed properly.

At first, at Step S201, the collation processor F4 collaborates with the transmission processor F1 and the receiving processor F2 to perform the collation processing. That is, the transmission processor F1 transmits a collation request signal to the vehicular portable device 200, and collates the vehicular portable device 200, based on the ID code included in a response signal returned from the vehicular portable device 200 as the response.

Then, when the collation is successful and it is determined that the vehicular portable device 200 is the vehicular portable device 200 associated with the vehicle V (that is, the proper vehicular portable device 200), the determination at Step S202 becomes YES and the flow moves to Step S203. When the collation is unsuccessful and it is determined that the vehicular portable device 200 is not the proper vehicular portable device 200 on the other hand, the determination at Step S202 becomes NO and the flow returns to Step S201.

At Step S203, the receiving processor F2 determines whether the driver information has been transmitted from the vehicular portable device 200. When the driver information has not been transmitted from the vehicular portable device 200, the determination at Step S203 becomes NO and the flow moves to Step S204. When the driver information has been transmitted from the vehicular portable device 200 on the other hand, the determination at Step S203 becomes YES and the flow moves to Step S205.

At Step S204, it is determined whether a fixed period of time has passed from the time point when the collation processor F4 determined that the collation was successful at Step S202. The fixed period of time here may be defined as the period that a predetermined tolerance (for example, 10 seconds) is added to the sampling time. When the fixed period of time has passed from the time point when the collation processor F4 determined that the collation was successful at Step S202, the determination at Step S204 becomes YES and the flow is terminated. When the fixed period of time has not passed from the time point when the collation processor F4 determined that the collation was successful at Step S202 on the other hand, the determination at Step S204 becomes NO and the flow returns to Step S203.

At Step S205, the user acting as the driver is specified, based on the terminal ID as the received driver information and the user management data stored in the storage unit 101M. That is, with reference to the user management data, the user who is associated with the terminal ID as the driver information is recognized as the driver. When the processing at Step S205 is completed, the flow moves to Step S206.

At Step S206, the driver setup reflector F6 performs the setup change of the cabin environments of the vehicle V to the environments corresponding to the preference of the driver specified at Step S205, and the flow is terminated.

The Summary of Embodiment 1

In the configuration described above, when the predetermined trigger signal is received from the in-vehicle apparatus 100, the vehicular portable device 200 starts the sampling processing and calculates the degree of change of the received signal strength for each portable terminal 300. Then, the vehicular portable device 200 determines the portable terminal 300 providing the smallest degree of change of the received signal strength as the driver terminal, and transmits the terminal ID of the driver terminal to the in-vehicle apparatus 100.

Here, the effect of the operation of the driver terminal determiner G4 is explained with reference to FIG. 9 and FIG. 10. The vehicular portable device 200 that has the function as the key of the vehicle V is generally carried by the driver. Therefore, paradoxically, the user Ua who carries the vehicular portable device 200 is considered as the user acting as the driver.

Figure 9:
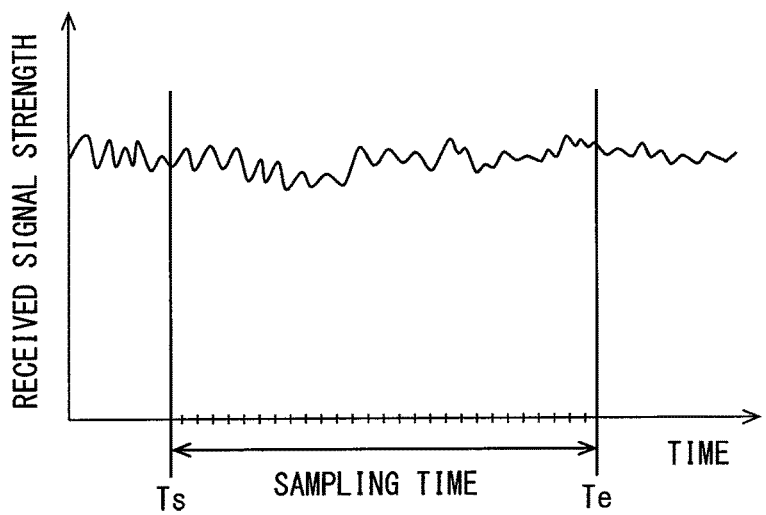
FIG. 9 is a conceptual diagram illustrating the tendency of a temporal change of the received signal strength in a vehicular portable device of a signal transmitted from a portable terminal 300 carried by a driver.

FIG. 9 is a conceptual diagram illustrating the time change of the received signal strength when the vehicular portable device 200 receives the signal transmitted from the portable terminal 300a carried by the user acting as the driver (here the user Ua). FIG. 10 is a conceptual diagram illustrating the time change of the received signal strength when the vehicular portable device 200 receives the signal transmitted from the portable terminal 300b carried by a user other than the driver (here the user Ub). In FIG. 10, the solid line expresses the change of the received signal strength at the vehicular portable device 200 of the signal transmitted by the portable terminal 300b, and the dashed line expresses the change of the received signal strength at the vehicular portable device 200 of the signal transmitted by the portable terminal 300a.

Figure 10:
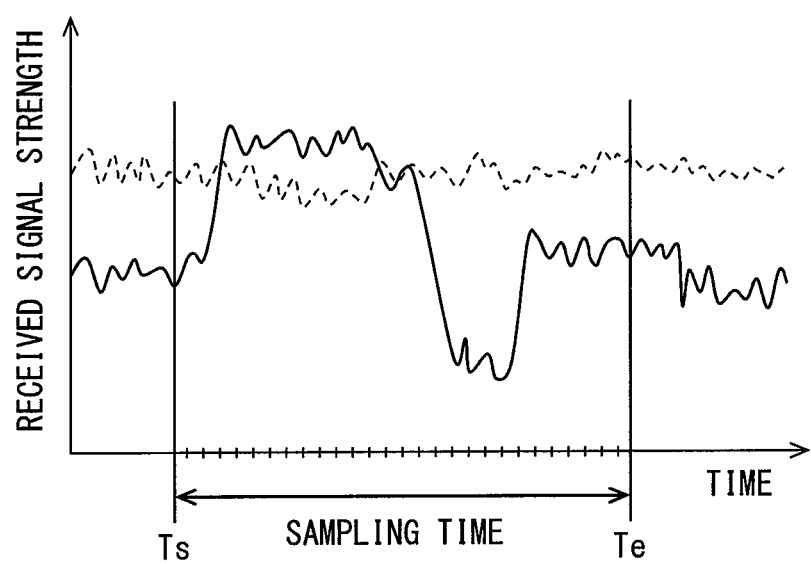
FIG. 10 is a conceptual diagram illustrating the tendency of a temporal change of the received signal strength in a vehicular portable device of a signal transmitted from a portable terminal 300 carried by users other than the driver.

In FIG. 9 and FIG. 10, the vertical axis expresses the received signal strength, and the horizontal axis is the time-axis. Time Ts on the time-axis expresses the sampling start time and time Te expresses the time when the sampling time from the sampling start time has passed. That is, the short range communication processor G3 performs the scanning successively from time Ts to time Te.

As illustrated in FIG. 9 and FIG. 10, it is supposed that the received signal strength of the signal transmitted from the portable terminal 300a carried by the user Ua changes more slightly than the received signal strength of the signal transmitted by the portable terminal 300b carried by the user Ub. This is based on the following reason.

The vehicular portable device 200 and the portable terminal 300a are carried by the same person (that is, the user Ua). Therefore, including the relative positional relationship of the portable terminal 300a and the vehicular portable device 200, the change of the propagation environment of the radio wave transmitted from the portable terminal 300a and received by the vehicular portable device 200 is relatively small. As a result, as illustrated in FIG. 9, the received signal strength in the vehicular portable device 200 of the signal transmitted from the portable terminal 300a is observed to have some undulations in the high-frequency component but a substantially constant level in the low-frequency component. That is, the distribution value as the degree of change becomes a relatively small value.

On the other hand, the portable terminal 300b is carried by another person (that is, the user Ub) than the user Ua who carries the vehicular portable device 200. Therefore, including the relative positional relationship of the portable terminal 300b and the vehicular portable device 200, the propagation environment of the signal transmitted from the portable terminal 300b and received by the vehicular portable device 200 changes easily.

Consequently, it is supposed that the received signal strength in the vehicular portable device 200 of the signal transmitted from the portable terminal 300b changes more significantly with time than the received signal strength in the vehicular portable device 200 of the signal transmitted from the portable terminal 300a, as illustrated in FIG. 10. That is, the distribution value as the degree of change calculated with regard to the portable terminal 300b becomes a relatively large value.

That is, there is a relatively high possibility that the portable terminal 300 having a relatively smaller distribution value as the degree of change is the portable terminal 300 carried by the driver. Then, in the present embodiment, the portable terminal 300 providing a relatively small degree of change of the received signal strength is employed as the driver terminal, based on the above consideration.

As a comparison configuration, it is also possible to determine the portable terminal 300 transmitting a signal with the highest received signal strength as the driver terminal, as the result of performing the scanning at a certain time point. However, the signal transmitted from the portable terminal 300 is subject to the influence of various factors as described above. Therefore, it is also plausible that the received signal strength of the signal transmitted from the portable terminal 300 carried by users other than the driver becomes larger temporarily than the received signal strength of the signal transmitted from the portable terminal 300 carried by the driver. When the scanning is performed to such timing, the portable terminal 300 carried by users other than the driver might be erroneously determined as the driver terminal.

On the other hand, in the present embodiment, the driver terminal determiner G4 determines the portable terminal 300 of which the distribution value as the degree of change is smallest, as the driver terminal. That is, the instantaneous magnitude of the received signal strength is not important in determining the driver terminal, but whether the constant received signal strength is maintained becomes relatively important.

Consequently, in the configuration of the present embodiment, even if the received signal strength of the signal transmitted from the portable terminal 300 carried by users other than the driver is temporarily larger in the sampling time than the received signal strength of the signal transmitted from the portable terminal 300 carried by the driver, it is possible to suppress determining erroneously the portable terminal 300 carried by users other than the driver as the driver terminal. That is, in the configuration of the present embodiment, it is possible to specify the portable terminal carried by the driver with a higher degree of accuracy, and consequently, it is possible to specify the driver with a higher degree of accuracy.

Up to this point, the embodiment has been exemplified; however, the embodiment is not restricted to the embodiment as described above, and it can be modified in various ways including modifications described henceforth, for example.

<Modification 1-1>

In the above illustration, by performing the scanning successively from the time point of receipt of the predetermined trigger signal until the predetermined sampling time passes, the information for determining the driver terminal (that is the received signal strength of each portable terminal 300) is acquired. However, this is not limiting.

For example, a modification is such that when the vehicular portable device 200 is set in the startup mode, the short range communicator 230 also always in the active mode; accordingly, the short range communication processor G3 performs the scanning successively. Among the results of the scanning performed successively, the results for the sampling time from the new one may be stored in the volatile memory included in the portable device-side storage unit 211 and the portable device-side controller 210. The scanning is performed at regular intervals; accordingly, the number of times of the scanning performed in the sampling time becomes constant. That is, the results of the scanning for the constant number of times from the newest one may be stored in the volatile memory included in the portable device-side storage unit 211 and the portable device-side controller 210, separately for each portable terminal 300.

In the above configuration, upon receipt of the trigger signal, the degree of change of the received signal strength for each portable terminal 300 can be calculated from the result of the scanning performed within the sampling time earlier than the time point of the receipt, and the driver terminal can be specified. Consequently, it is possible to return more quickly the driver information to the in-vehicle apparatus 100 with reference to the receipt of the trigger signal.

<Modification 1-2>

In relation to the modification 1-1 described above, when the vehicular portable device 200 is in the startup mode, the degree of change of the received signal strength for each portable terminal 300 may be calculated in the successive scanning, based on the result of the scanning performed in the fixed period of time before or after the time point of receipt of the predetermined trigger signal.

<Modification 1-3>

When the operation receiver G5 detects that the user's push operation of the switch 240, the vehicular portable device 200 may collect the received signal strength at multiple times for each portable terminal 300, by performing the scanning successively from that time point until the sampling time passes. Then, based on the received signal strength collected for each portable terminal 300, the vehicular portable device 200 may calculate the degree of change of the received signal strength for each portable terminal 300 to determine the driver terminal.

For example, the short range communication processor G3 may start a series of scanning when the push operation of the switch 240 to lock the door of the vehicle V is detected, and when the push operation of the switch 240 for instructing to determine the driver terminal is detected.

In the above configuration, the driver can instruct the vehicular portable device 200 to perform the processing for determining the driver terminal by operating the vehicular portable device 200.

This modification 1-3 may be combined with the above-described modifications 1-1 and 1-2. That is, in the successive scanning when the vehicular portable device 200 is in the startup mode, the operation receiver G5 may calculate the degree of change of the received signal strength for each portable terminal 300, based on the result of the scanning performed in the sampling time immediately before the time point of detecting the user's push operation of the switch 240, or based on the result of the scanning performed by the operation receiver G5 in the fixed period of time before or after the time point of detecting the user's push operation of the switch 240.

<Modification 1-4>

The short range communication processor G3 may stop the sampling processing when the vibration sensor 250 continues to detect the vibration of magnitude less than or equal to the predetermined threshold for a fixed period of time (for example, 5 seconds). The threshold here is a threshold for determining whether the user carrying the vehicular portable device 200 is moving. The detection result of the vibration sensor 250 is acquired by the vibration information acquirer G7.

Generally, when the user carrying the vehicular portable device 200 moves, the vibration sensor 250 detects a larger vibration than the predetermined threshold. In other words, the detection value of the vibration sensor 250 less than or equal to the predetermined threshold means the state where the user carrying the vehicular portable device 200 is not moving.

When the user carrying the vehicular portable device 200 is not moving, the change with time of the received signal strength of the signal received from the portable terminal 300 carried by users other than the driver, due to reflection and attenuation of the radio wave by a human body or peripheral environments, may become small. Consequently, by suppressing the scanning when the user carrying the vehicular portable device 200 is not moving, it is possible to discriminate the portable terminal 300 carried by the driver and the portable terminal 300 carried by other users, with a higher degree of accuracy. It is also possible to suppress the power consumption in the vehicular portable device 200.

<Modification 1-5>

The parking position of the vehicle V is stored in the portable device-side storage unit 211 for example, and when the self unit enters within a fixed distance from the parking position, the vehicular portable device 200 may start the processing for specifying the driver terminal (the sampling processing). The parking position may be defined as a position acquired by the position information acquirer G6 at the time point of the last collation, for example. The portable device-side controller 210 stores the position information as the parking position in the portable device-side storage unit 211.

Subsequently, when it is detected that the self unit is departed from the vehicle V (more than the fixed distance) based on the position information acquired by the position information acquirer G6, the departure is held as an internal state. Then, when the distance between the parking position and the self unit becomes within the fixed distance again after the departure, the sampling processing is started.

In the above configuration, it is possible to start the sampling processing even when the vehicular portable device 200 does not yet enter in the vehicle communication range or even when the trigger signal is not received.

<Modification 1-6>

In the above-described embodiment 1, the vehicular portable device 200 terminates the sampling processing automatically at the time point when a fixed sampling time has passed after starting the sampling processing concerned and determines the driver terminal. However, this is not limiting.

For example, in performing the scanning successively, the vehicular portable device 200 may terminate the sampling processing upon receipt of the signal (determination instruction signal) instructing to determine the driver terminal from the in-vehicle apparatus 100 and may determine the driver terminal based on the received signal strength at multiple time points collected already.

The sampling processing may be continued even after the determination instruction signal is received. That is, when the determination instruction signal is received from the in-vehicle apparatus 100 in the state of performing the scanning successively, the driver terminal may be determined based on the received signal strength collected already, and the sampling processing may be continued after that moment. In this configuration, it is possible to determine the driver terminal multiple times in a series of operations after the user carrying the vehicular portable device 200 approaches the vehicle V until the user starts driving.

The timing at which the in-vehicle apparatus 100 transmits the determination instruction signal may be defined by the time point when the touch sensor 106 of the driver's seat door detects the touch by the user, for example.

<Modification 1-7>

In the above modification 1-6, the technology of locating the vehicular portable device 200 with respect to the vehicle V may be employed and the in-vehicle apparatus 100 may transmit the determination instruction signal upon detecting that the positional relationship between the vehicle V and the vehicular portable device 200 reaches a predetermined positional relationship. For example, the in-vehicle apparatus 100 may transmit the determination instruction signal at the time point when it is detected that the vehicular portable device 200 exists within 70 cm from the door handle of the driver's seat door.

Embodiment 2

Next, Embodiment 2 is explained with reference to drawings. In the following, the same references are used to refer to elements having the same functions as in the above Embodiment 1, and the repeated explanation thereof is omitted. When a part of the configuration is described, Embodiment 1 described above can be referred to and applied to other parts of the configuration.

As is the case with Embodiment 1 described above, the user identification system 1 according to Embodiment 2 includes the in-vehicle apparatus 100, the vehicular portable device 200, and the portable terminal 300. The main difference between Embodiment 1 and Embodiment 2 lies in the timing and frequency at which the vehicular portable device 200 performs the scanning. In connection with it, a part of the processing that the vehicle-side controller 101 performs is different from that of Embodiment 1.

Specifically, in Embodiment 1 described above, when the predetermined trigger signal is received from the in-vehicle apparatus 100, the short range communication processor G3 performs the scanning successively for a fixed period of time from the receive time point, and collects the data for calculating the degree of change of the received signal strength for each portable terminal 300.

As opposed to this, the short range communication processor G3 according to the present embodiment performs the scanning whenever receiving the scan instruction signal transmitted from the in-vehicle apparatus 100 multiple times at different timing. By this, the received signal strength for each portable terminal 300 at multiple time points is collected, and the degree of change is calculated. Hereinafter, the configuration of the present embodiment is described focusing on the portion relevant to such differences.

In the present embodiment, multiple conditions (scan instruction conditions) under which the scan instruction signal shall be transmitted are set in the vehicle-side controller 101 in advance. The transmission processor F1 determines successively whether any of the multiple scan instruction conditions is satisfied, based on the vehicle information acquired by the vehicle information acquirer F3 or on the communication state with the vehicular portable device 200. Then, when it is determined that one of the scan instruction conditions is satisfied, the scan instruction signal is outputted to the LF controller 105 so as to be transmitted.

These scan instruction conditions may be designed properly. In the present embodiment, as an example, the scan instruction conditions are set up so that the scan instruction signal may be transmitted at the three time points: the time point when the collation with the vehicular portable device 200 is effectuated, the time point when the user touches the touch sensor 106 in the state where the collation is effectuated, and the time point when the door of the vehicle V is opened.

Naturally, the timing at which the scan instruction signal is transmitted to the in-vehicle apparatus 100 is not restricted to the example described above. The scan instruction signal may be transmitted at the time point when it is detected that the vehicular portable device 200 has entered into the communication range of the in-vehicle apparatus 100, at the time point when it is detected that the vehicular portable device 200 exists in the cabin of the vehicle, or at the time point of detecting the user's operation for starting the engine of the vehicle V. The scan instruction signal may be transmitted at the time point when the occupant detection sensor detects that the user sits down to the driver's seat.

That is, the scan instruction signal may be transmitted at the timing designed properly, such as at the timing when the predetermined user's operation to the vehicle V is performed, at the timing when the vehicle V makes a transition to the predetermined state according to the user's operation, or at the timing when the positional relationship of the vehicle V and the vehicular portable device 200 reaches the predetermined positional relationship. However, the scan instruction signal is assumed to be transmitted at two different time points at least in a series of operations after the user carrying the vehicular portable device 200 enters into the communication range of the vehicle V until the user starts driving.

Based on the vehicle information acquired by the vehicle information acquirer F3, the transmission processor F1 may determine whether the predetermined user's operation has been performed and whether the vehicle V has made a transition to the predetermined state. Whether the positional relationship of the vehicle V and the vehicular portable device 200 has reached the predetermined positional relationship may be determined by whether the response signal transmitted from the vehicular portable device 200 has been received. The method of locating the vehicular portable device 200 with respect to the vehicle V may employ the well-known method.

When the scan instruction signal is received from the in-vehicle apparatus 100, the vehicle communication processor G1 of the vehicular portable device 200 notifies the fact to the power supply manager G2 and the short range communication processor G3. Then, the power supply manager G2 shifts the short range communicator 230 to the active mode if the short range communicator 230 is in the low-power consumption mode, and the short range communication processor G3 performs the scanning. When the scanning is completed, the short range communication processor G3 notifies the fact to the power supply manager G2. The power supply manager G2 shifts the short range communicator 230 to the low-power consumption mode again.

In the above configuration, the short range communication processor G3 performs the scanning multiple times, in a series of operations after the user carrying the vehicular portable device 200 enters into the communication range of the vehicle V until the user starts driving. Specifically, in the present embodiment, the scanning is performed at the three moments: at the time point when the collation is effectuated outside the cabin, at the time point when the user touches the door handle subsequently, and at the time point when the door is opened.

The driver terminal determiner G4 calculates the degree of change of the received signal strength for each portable terminal 300 based on the received signal strength for each portable terminal 300 at multiple time points, collected as the result of the scanning performed at multiple time points. In the present embodiment, the scanning is not performed as many times as in Embodiment 1. Accordingly, it is preferable to evaluate the degree of change by the difference between the maximum value and the minimum value of the received signal strength. Naturally, the degree of change may be the distribution value or another index.

<Vehicle Apparatus-Side Processing>

Figure 11:
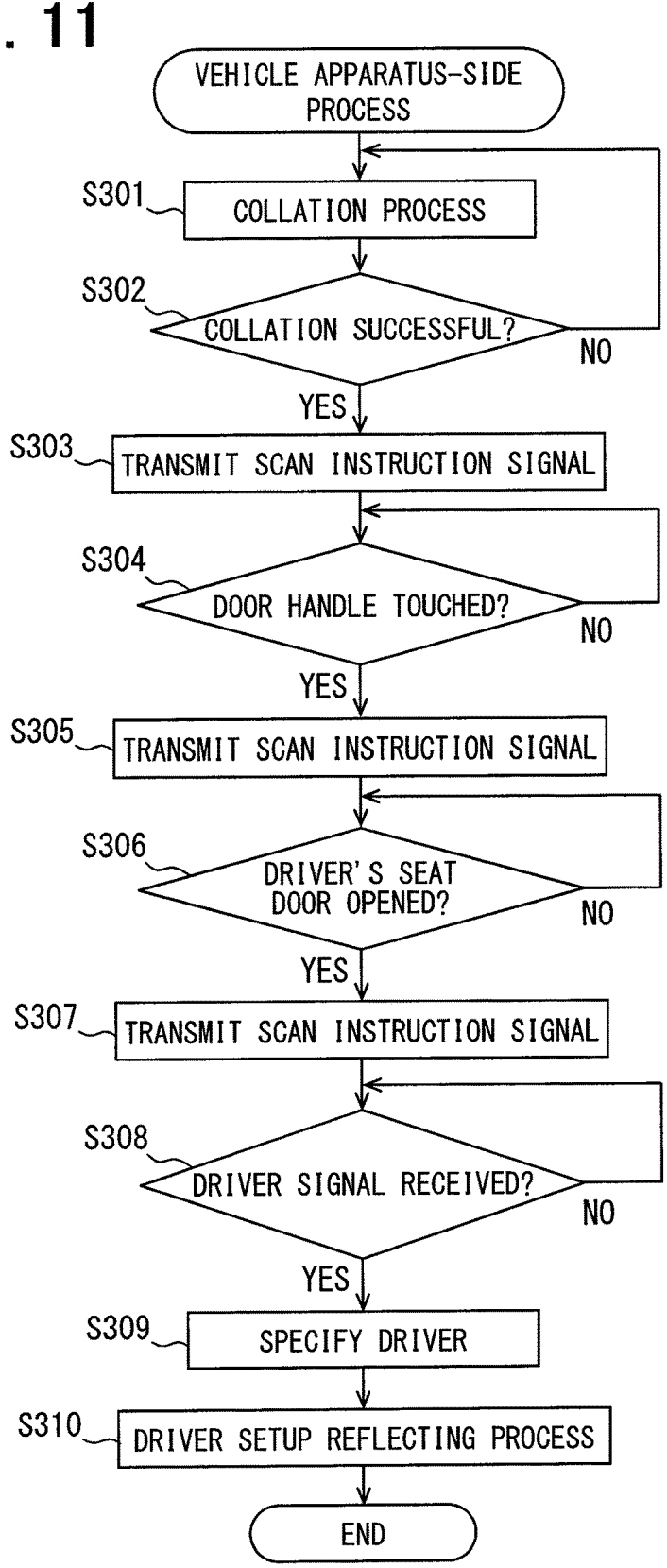
FIG. 11 is a flow chart for explaining vehicle apparatus-side processing in Embodiment 2.

Next, the vehicle apparatus-side processing in the present embodiment is explained with reference to the flow chart illustrated in FIG. 11. The vehicle apparatus-side processing illustrated in FIG. 11 may be started when it is detected that the vehicular portable device 200 has entered the vehicle communication range.

Figure 8:
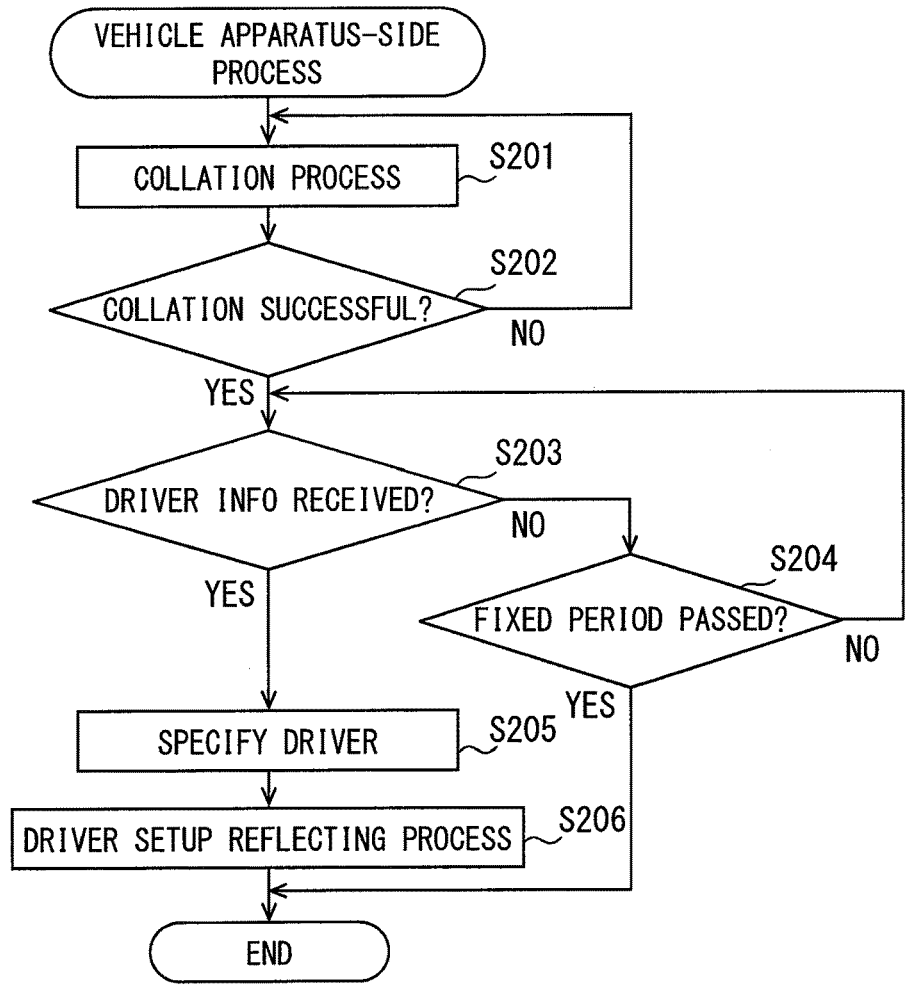
FIG. 8 is a flow chart for explaining vehicle apparatus-side processing.

At first, at Step S301, the collation processor F4 collaborates with the transmission processor F1 and the receiving processor F2 to perform the collation processing, as is the case with Step 201 of FIG. 8. Then, when the collation is successful and it is determined that the vehicular portable device 200 is the proper vehicular portable device, the determination at Step S302 becomes YES and the flow moves to Step S303. When the collation is unsuccessful and it is determined that the vehicular portable device 200 is not the proper vehicular portable device on the other hand, the determination at Step S302 becomes NO and the flow returns to Step S301.

At Step S303, the transmission processor F1 outputs a scan instruction signal to the LF controller 105 so as to be transmitted, and the flow moves to Step S304. At Step S304, the transmission processor F1 determines whether the door handle of the vehicle V is touched or not, based on the vehicle information acquired by the vehicle information acquirer F3. Whether the door handle is touched or not is shown in the detection result of the touch sensor 106. Then, when the door handle is touched, the determination at Step S304 becomes YES, and the flow moves to Step S305.

When the door handle is not touched on the other hand, the determination at Step S304 becomes NO, and the flow returns to Step S304. That is, the flow is in the standby state until the door handle is touched. The present flow may be terminated if the door handle has not been touched even when a fixed period of time (for example, 1 minute) has elapsed after the flow shifts from Step S303 to Step S304.

At Step S305, the transmission processor F1 outputs the scan instruction signal to the LF controller 105 so as to be transmitted, and the flow moves to Step S306. At Step S306, the transmission processor F1 determines whether the door of the vehicle V has been opened, based on the vehicle information acquired by the vehicle information acquirer F3. Whether the door has been opened or not is shown in the courtesy switch output that the vehicle information acquirer F3 acquires via the body ECU 110. Then, when it is detected that the door has been opened, the determination at Step S306 becomes YES and the flow moves to Step S307.

When the door stays closed on the other hand, the determination at Step S306 becomes NO and the flow returns to Step S306. That is, the flow is in the standby state until it is detected that the door is opened. The present flow may be terminated if the door has not been opened even when a fixed period of time (for example, 1 minute) has elapsed after the flow shifts from Step S305 to Step S306.

At Step S307, the transmission processor F1 outputs a scan instruction signal to the LF controller 105 so as to be transmitted, and the flow moves to Step S308. At Step S308, the receiving processor F2 determines whether the driver information has been transmitted from the vehicular portable device 200. When the driver information has not been transmitted from the vehicular portable device 200, the determination at Step S308 becomes NO, and the flow returns to Step S308. That is, the flow is in the standby state until the driver information is transmitted. Then, when the driver information has been transmitted from the vehicular portable device 200, the determination at Step S308 becomes YES and the flow moves to Step S309.

At Step S309, the user acting as the driver is specified, based on the terminal ID as the received driver information and the user management data stored in the storage unit 101M. That is, with reference to the user management data, the user who is associated with the terminal ID as the driver information is recognized as the driver. When the processing at Step S309 is completed, the flow moves to Step S310.

At Step S310, the driver setup reflector F6 performs the setup change of the cabin environments of the vehicle V to the environments corresponding to the preference of the driver specified at Step S309, and the flow is terminated.

<Portable Device-Side Processing>

Figure 12:
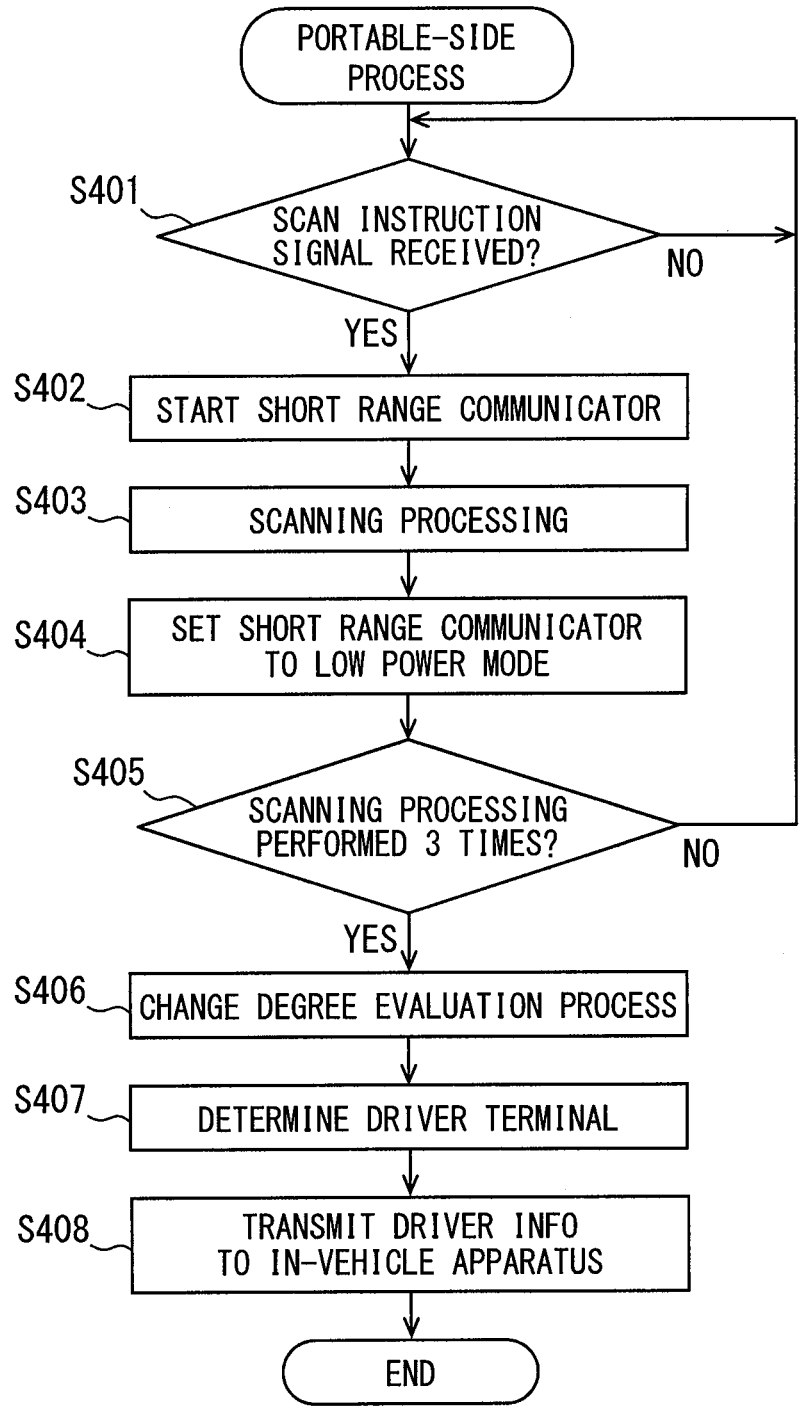
FIG. 12 is a flow chart for explaining portable device-side processing in Embodiment 2.

Next, the portable device-side processing in the present embodiment is explained with reference to the flow chart illustrated in FIG. 12. The portable device-side processing illustrated in FIG. 12 may be started when the vehicular portable device 200 shifts from the sleep mode to the startup mode, for example. In addition, the portable device-side processing may be started when the collation request signal is received from the in-vehicle apparatus 100 and the response signal is returned. That is, the conditions to start the portable device-side processing may be designed properly. It is assumed that the short range communicator 230 is in the low-power consumption mode at the start of the present flow.

At first, at Step S401, the vehicle communication processor G1 determines whether the scan instruction signal has been received from the in-vehicle apparatus 100. When the scan instruction signal has not been received, the determination at Step S401 becomes NO, and the flow returns to Step S401. That is, the flow is in the standby state until the scan instruction signal is received. Then, when the scan instruction signal is received, the determination at Step S401 becomes YES, and the flow moves to Step S402.

At Step S402, the power supply manager G2 shifts the short range communicator 230 from the low-power consumption mode to the active mode, and the flow moves to Step S403. At Step S403, the short range communication processor G3 performs the scanning, and the flow moves to Step S404.

At Step S404, the power supply manager G2 shifts the short range communicator 230 from the active mode to the low-power consumption mode, and the flow moves to Step S405. At Step S405, the driver terminal determiner G4 determines whether the number of times of performing the scanning after starting the present flow has reached the number of planned operation times (here 3 times).

When the number of times of performing the scanning after starting the present flow has not reached the number of planned operation times, the determination at Step S405 becomes YES, and the flow moves to Step S406. On the other hand, when the number of times of performing the scanning after starting the present flow has not yet reached the number of planned operation times, the determination at Step S405 becomes NO and the flow returns to Step S401.

The number of planned operation times may be stored in the portable device-side storage unit 211.

At Step S406, the driver terminal determiner G4 calculates the degree of change of the received signal strength for each portable terminal 300 based on the received signal strength for each portable terminal 300 at multiple times collected by the processing described above, and the flow moves to Step S407.

At Step S407, the driver terminal determiner G4 determines as the driver terminal the portable terminal 300 providing the smallest degree of change calculated at Step S406, and the flow moves to Step S408. At Step S408, the vehicle communication processor G1 transmits the terminal ID of the portable terminal 300 corresponding to the driver terminal determined at Step S407 to the in-vehicle apparatus 100, as the driver information, and the flow is terminated.

In the above illustration, the in-vehicle apparatus 100 transmits the scan instruction signal in the state where the collation with the vehicular portable device 200 is effectuated. However, this is not limiting. The scan instruction signal may be transmitted before the collation becomes successful. The scan instruction signal may be used also as the wake signal or the collation request signal. That is, it may be preferable that the vehicular portable device 200 perform the scanning each time the vehicular portable device 200 receives the wake signal or the collation request signal. The scanning may be performed whenever not only the wake signal and the collation request signal are received but also a signal from the in-vehicle apparatus 100 is received.

The Summary of Embodiment 2

In the configuration described above, the vehicular portable device 200 collects the received signal strength for each portable terminal 300 at multiple time points. Then, based on the received signal strength collected for each portable terminal 300 at multiple time points, the vehicular portable device 200 calculates the degree of change of the received signal strength for each portable terminal 300, and determines the portable terminal 300 providing the smallest degree of change as the driver terminal. The vehicular portable device 200 transmits the terminal ID of the portable terminal 300 as the driver information to the in-vehicle apparatus 100.

Here, the portable terminal 300 providing the smallest degree of change of the received signal strength is the portable terminal 300 carried by the user acting as the driver, as described in Embodiment 1. Therefore, in the present embodiment, the same effect is produced as in Embodiment 1.

In the configuration of the present embodiment, it is possible to suppress the number of times of performing the scanning rather than in Embodiment 1. Therefore, it is possible to suppress the power consumption in the vehicular portable device 200 rather than in Embodiment 1.

In relation to the effect described above, in the configuration of the present embodiment, it is possible to suppress the period to make the short range communicator 230 act in the active mode. Accordingly, it is possible to suppress the power consumption in the vehicular portable device 200 rather than in Embodiment 1.

The user carrying the vehicular portable device 200 does not necessarily get into the vehicle V just because the user has approached the vehicle V. After the user carrying the vehicular portable device 200 enters the communication range of the vehicle V, the user may secede from the communication range of the vehicle V in some cases.

In Embodiment 1, even in such cases, once a trigger signal is received, the scanning is performed successively for a fixed period of time. As compared with this, in the present embodiment, the scanning is performed only when the scan instruction conditions determined in advance is satisfied. Therefore, in the configuration of the present embodiment, it is possible to suppress performing the unnecessary scanning as compared with Embodiment 1. Consequently, it is possible to suppress the power consumption in the vehicular portable device 200 rather than in Embodiment 1.

<Modification 2-1>

In the above illustration, the scanning is performed when the scan instruction signal is received. However, this is not limiting. When the push operation of the switch 240 is performed by the user, the vehicular portable device 200 may perform the scanning multiple times after the predetermined time interval passes from that time point, and may collect the received signal strength at multiple time points for each portable terminal 300. Then, based on the received signal strength collected for each portable terminal 300, the vehicular portable device 200 may calculate the degree of change of the received signal strength for each portable terminal 300 to determine the driver terminal. Whether the push operation of the switch 240 has been performed by the user is specified by the operation receiver G5.

The time interval here may be set sufficiently longer than the interval of the scanning in the Embodiment 1, as one second for example. The operation interval of the scanning in the modification 2-1 may be not a constant value but a random value. For example, the short range communication processor G3 in the modification 2-1 may be configured such that the scanning is performed for a predetermined number of times at the interval according to a predetermined probability density function (for example, Poisson distribution), when the push operation of the switch 240 is performed by the user.

In this modification 2-1, the same effect is produced as in Embodiment 2. When it is before establishing the communication connection with the portable terminal 300 and when there is no necessity of performing the scanning, the power supply manager G2 sets the short range communicator 230 to the low-power consumption mode.

<Modification 2-2>

In Embodiment 2, the scanning is performed upon receipt of the scan instruction signal. However, this is not limiting. The parking position of the vehicle V may be stored in the portable device-side storage unit 211 and the scanning may be performed each time the self unit approaches the parking position at a fixed distance. For example, the scanning may be performed at each time point when the distance of the self unit and the parking position becomes 10 m, 5 m, and 3 m.

As described in the modification 1-5, the parking position may be defined as a position acquired by the position information acquirer G6 at the time point of the last collation. When it is detected that the self unit is departed from the vehicle V (more than the fixed distance) from the position information acquired by the position information acquirer G6, the portable device-side controller 210 holds, as its internal state, the departure. Each time the distance between the parking position and the self unit becomes within the above-described distance again after the departure, the scanning is performed.

In this configuration, the same effect is produced as in Embodiment 2. In the modification 2-2, it is possible to perform the scanning even before the vehicular portable device 200 enters in the vehicle communication range.

<Modification 2-3>

In the above illustration, the vehicular portable device 200 determines the driver terminal when the scanning is performed a preset number of times. However, this is not limiting. Until the time when the signal (the determination instruction signal) instructing to determine the driver terminal is received from the in-vehicle apparatus 100, the scanning may be performed each time the scan instruction signal is received from the in-vehicle apparatus 100, and at the time when the determination instruction signal is received, the driver terminal may be determined based on the received signal strength collected by then.

The in-vehicle apparatus 100 may assign the role of the above-described determination instruction signal to a scan instruction signal to be transmitted at predetermined timing among the scan instruction signals transmitted at various timing. In this configuration, when the specific scan instruction signal is received, the vehicular portable device 200 performs the scanning based on the scan instruction signal concerned, and at the same time, the vehicular portable device 200 determines the driver terminal based on the received signal strength collected by then.

The timing at which the in-vehicle apparatus 100 transmits the determination instruction signal may be defined by the time point when the touch sensor 106 of the driver's seat door detects the touch by the user, or the time point when the engine starting button 107 is depressed, for example.

<Modification 3-1>

In both of Embodiment 1 and Embodiment 2, the vehicular portable device 200 transmits the terminal ID unique to the portable terminal 300 as the driver information. However, this is not limiting. The vehicular portable device 200 may specify the user acting as the driver from the terminal ID of the driver terminal and may transmit to the in-vehicle apparatus 100 the information indicative of the user (for example, the user ID) as the driver information. That is, the function corresponding to the driver specifier F5 may be provided in the vehicular portable device 200. The user ID determined from the terminal ID of the driver terminal also corresponds to an example of the driver terminal-related information.

The modification 3-1 may be realized by, for example, the portable device-side storage unit 211 of the vehicular portable device 200 storing in advance the data (referred to as the terminal management data) that associates the user ID of each user of the vehicle V with the terminal ID of the portable terminal 300 carried by the user. In this configuration, when the driver terminal is determined, the vehicular portable device 200 refers to the terminal management data and determines as the driver the user associated with the terminal ID of the portable terminal 300 serving as the driver terminal. The vehicular portable device 200 transmits the user ID of the user corresponding to the driver to the in-vehicle apparatus 100 as the driver information. In such a configuration, the same effect as in the embodiments described above is produced.

<Modification 3-2>

In the above Embodiment 1 and Embodiment 2, the vehicle setup data of each user is stored in the storage unit 101M of the in-vehicle apparatus 100 as the user management data, and the driver setup reflector F6 instructs each ECU (for example, the body ECU 110) or each electrical device (such as the navigation system) to make the vehicle setup according to the vehicle setup data of the driver. However, this is not limiting.

Each ECU may store the vehicle setup of each user in the range relevant to the ECU, and the in-vehicle apparatus 100 may notify the user ID of the user acting as the driver to each ECU. Then, each ECU reads the vehicle setup corresponding to the user ID notified from the in-vehicle apparatus 100 and performs the setup change.

In this configuration also, it is possible to automatically change the setup of the vehicle V into the setup corresponding to the driver's preference.

<Modification 3-3>

In the above, the vehicular portable device 200 may transmit, in addition to the driver information, occupant information as the information about the occupants other than the driver, namely the fellow occupants (referred to as non-driver occupants). Specifically, when the driver terminal is determined, the vehicular portable device 200 transmits to the in-vehicle apparatus 100 the terminal ID of the portable terminals 300 other than the driver terminal among the portable terminals 300 existing in the periphery of the self unit, as the occupant information.

Naturally, as described in the modification 1, when the terminal management data is stored in the portable device-side storage unit 211, the user ID corresponding to the terminal ID of the portable terminals 300 other than the driver terminal among the portable terminals 300 existing in the periphery of the self unit may be transmitted, instead of the terminal ID, as the occupant information. The occupant information corresponds to the non-driver terminal-related information.

In this configuration, the in-vehicle apparatus 100 can also acquire the information about the non-driver occupant. Then, the in-vehicle apparatus 100 can change the vehicle setup based on the information on the non-driver occupant. For example, it is possible to adjust the seat position and to select an air outlet fpr blowing out the air from the air conditioner, based on the vehicle setup data associated with the non-driver occupant. For example, when multiple users as the occupants other than the driver exist, the air from the air conditioner is blown out at both the front occupant's seat and the backseat.

<Modification 3-4>

In the above, it is assumed that, when the vehicular portable device 200 is in the sleep mode, the short range communicator 230 is also set to the low-power consumption mode. However, this is not limiting. The short range communicator 230 may be kept in the active mode, even when the vehicular portable device 200 is in the sleep mode. The vehicular portable device 200 may always be in the startup mode.

<Modification 3-5>

In the above illustration, in a series of operations after the user carrying the vehicular portable device 200 approaches the vehicle V until the user starts driving, the driver specification processing is performed one time. However, this is not limiting. In a series of operations after the user carrying the vehicular portable device 200 approaches the vehicle V until the user starts driving, the driver specification processing may be performed multiple times. When the driver specification processing is performed multiple times, the driver recognized by the in-vehicle apparatus 100 may be updated each time the in-vehicle apparatus 100 (or the vehicular portable device 200) specifies the driver.

For example, a series of operations after the user carrying the vehicular portable device 200 approaches the vehicle V until the user starts driving (departure) are divided into two scenes, the scene where the vehicular portable device 200 exists outside the cabin and the scene where the vehicular portable device 200 exists inside the cabin, and the driver specification processing is performed in each scene. The scene where the vehicular portable device 200 exists outside the cabin corresponds to the operation before the user carrying the vehicular portable device 200 gets into the vehicle V, and the scene where the vehicular portable device 200 exists inside the cabin corresponds to the operation after the user carrying the vehicular portable device 200 gets into the vehicle V.

Furthermore, when the driver terminal is determined once and is subsequently determined again, the vehicular portable device 200 may determine the driver terminal, by employing not only the received signal strength newly collected after determining the driver terminal last time, but also the received signal strength employed in determining the driver terminal last time.

For example, in the modification 2-3, the determination instruction signal is transmitted at the time point when the vehicular portable device 200 exists outside the cabin and the touch sensor 106 of the driver's seat door detects the user touching the touch sensor 106. Subsequently, the scan instruction signal is transmitted at multiple time points (at least once), and the determination instruction signal is transmitted again when the engine starting button 107 is pushed.

In this configuration, the driver terminal is determined twice, before and after the driver gets into the vehicle V. Accompanying it, the driver recognized by the in-vehicle apparatus 100 is also updated.

The effect produced by this modifications is as follows. The individual specific information obtained by specifying the driver can be reflected to the services that can be provided in various respective scenes after the driver approaches the vehicle until the driver starts the vehicle. For example, before getting in the vehicle V, the individual preference can be reflected to the welcome illumination according to the driver and the number of occupants, and to the seat arrangement. After getting in the vehicle, the individual preference can be reflected to the contents of the welcome screen on a display (not shown) mounted to the vehicle V. After starting the engine, the individual preference can be reflected to the mirror adjustment, the air-conditioning, the setup of the navigation device, etc.

Consequently, for the in-vehicle apparatus 100, it is preferable to specify that the driver as early as possible, because the kinds of service available to the driver increase. On the other hand, the driver specification accuracy becomes higher when the driver terminal is determined based on the result of as many times of scanning as possible. Therefore, compared with the result specified before getting in the vehicle V, the accuracy becomes higher for the specification result obtained based on the result of the scanning performed before getting in the vehicle V and the result of the scanning performed after getting in the vehicle V. That is, in the modification 3-5 applying the modification 2-3, it is possible for the in-vehicle apparatus 100 to recognize the driver with a higher degree of accuracy.

In the above, the configurations based on the modification 2-3 of Embodiment 2 are illustrated. The ideas of the modification 3-5 are applicable to Embodiment 1. For example, in the configuration of the modification 1-6, the in-vehicle apparatus 100 may transmit the determination instruction signal at multiple predetermined time points.

What is claimed is:

1. A user identification system comprising:
   an in-vehicle apparatus mounted to a vehicle used by a plurality of users; and
   a vehicular portable device carried by a user acting as a driver among the users and associated with the in-vehicle apparatus,
   wherein:
   the in-vehicle apparatus includes
   a vehicle apparatus-side communicator that communicates with the vehicular portable device;
   the vehicular portable device includes:
   a first communicator that communicates with the in-vehicle apparatus;
   a second communicator that performs a short range wireless communication with portable terminals carried by the users;
   a received signal strength detector that detects received signal strength of signals received by the second communicator from the portable terminals; and
   a driver terminal determiner that, based on the received signal strength detected by the received signal strength detector, determines a driver terminal which is the portable terminal carried by the user acting as the driver;
   the received signal strength detector detects the received signal strength of the signals received from the portable terminals at a plurality of time points; and
   the driver terminal determiner determines as the driver terminal the portable terminal that provides a smallest degree of change of the received signal strength detected multiple times.

2. The user identification system according to claim 1, wherein:
   the received signal strength detector detects successively the received signal strength of the signals received from the portable terminals, at least in a time period determined with reference to a time point when the first communicator receives a predetermined trigger signal transmitted from the in-vehicle apparatus; and
   the driver terminal determiner determines as the driver terminal the portable terminal that provides the smallest degree of change of the received signal strength detected by the received signal strength detector in the time period.

3. The user identification system according to claim 2, wherein:
   after transmitting the trigger signal, the in-vehicle apparatus transmits a determination instruction signal instructing to determine the driver terminal; and
   the received signal strength detector detects successively the received signal strength of the signal received from the portable terminals after the first communicator receives the trigger signal transmitted from the in-vehicle apparatus until the first communicator receives the determination instruction signal.

4. The user identification system according to claim 2, wherein:
   the vehicular portable device includes
   a switch that is operated by the user; and
   the driver terminal determiner determines the driver terminal, based on the received signal strength detected successively by the received signal strength detector in a time period determined with reference to a time point when the switch is operated by the user.

5. The user identification system according to claim 2, wherein:
the vehicular portable device includes
a vibration sensor that detects vibration occurring on the vehicular portable device; and
in successively detecting the received signal strength of the signals from the portable terminals, the received signal strength detector stops detection of the received signal strength upon the vibration sensor continuing to detect the vibration of magnitude less than or equal to a predetermined threshold for a fixed period of time.

6. The user identification system according to claim 2, wherein:
the vehicular portable device includes
a position information acquirer that acquires position information indicative of a current position of the vehicular portable device, based on a radio wave transmitted from a positioning satellite;
the vehicular portable device stores as a parking position of the vehicle the position information that the position information acquirer acquires at a time point when the first communicator receives the signal from the in-vehicle apparatus;
when a distance between the parking position and the vehicular portable device becomes greater than or equal to a predetermined distance and thereafter becomes less than the predetermined distance, the received signal strength detector detects successively the received signal strength of the signals received from the portable terminals for a fixed period of time from the time point; and
the driver terminal determiner determines as the driver terminal the portable terminal providing the smallest degree of change of the received signal strength detected by the received signal strength detector multiple times.

7. The user identification system according to claim 1, wherein:
at a plurality, of predetermined time points, the vehicle apparatus-side communicator transmits a scan instruction signal instructing the vehicular portable device to detect the received signal strength of the signals received from the portable terminals;
the received signal strength detector detects the received signal strength of the signals received from the portable terminals, each time the first communicator receives the scan instruction signal transmitted from the in-vehicle apparatus; and
the driver terminal determiner determines as the driver terminal the portable terminal providing the smallest degree of change of the received signal strength detected multiple times.

8. The user identification system according to claim 7, wherein
the vehicle apparatus-side communicator transmits the scan instruction signal at two or more time points at least, among
a time point of detecting entry of the vehicular portable device into the vehicle communication range of the in-vehicle apparatus,
a time point of detecting touch of a door handle of the vehicle by the user,
a time point of opening a door of the vehicle,
a time point of detecting presence of the vehicular portable device in a cabin of the vehicle, and
a time point of detecting a user's operation for starting the engine of the vehicle.

9. The user identification system according to claim 7, wherein:
the vehicular portable device includes
a switch that is operated by the user;
when the switch is operated by the user, the received signal strength detector detects the received signal strength of the signals received from the portable terminals multiple times at predetermined time intervals; and
the driver terminal determiner determines as the driver terminal the portable terminal providing the smallest degree of change of the received signal strength detected multiple times.

10. The user identification system according to claim 1, wherein
when the driver terminal determiner determines the driver terminal, the first communicator transmits driver terminal-related information as the information corresponding to the driver terminal to the in-vehicle apparatus.

11. The user identification system according to claim 10, wherein:
the vehicle apparatus-side communicator receives the driver terminal-related information transmitted from the vehicular portable device; and
the in-vehicle apparatus further includes
a driver specifier that specifies the user acting as the driver among the users, based on the driver terminal-related information received by the vehicle apparatus-side communicator.

12. The user identification system according to claim 10, wherein:
in a series of operations after the user carrying the vehicular portable device approaches the vehicle until the user starts driving, the driver terminal determiner determines the driver terminal multiple times;
each time the driver terminal determiner determines the driver terminal, the first communicator transmits the driver terminal-related information corresponding to the driver terminal to the in-vehicle apparatus; and
each time the vehicle apparatus-side communicator receives the driver terminal-related information, the in-vehicle apparatus updates the user acting as the driver among the users.

13. The user identification system according to claim 10, wherein:
to the in-vehicle apparatus, the first communicator transmits non-driver terminal-related information as the information corresponding to the portable terminals other than the driver terminal among the portable terminals existing around the vehicular portable device;
the vehicle apparatus-side communicator receives the non-driver terminal-related information; and
the in-vehicle apparatus specifies occupants other than the driver in the current driving among the users, based on the non-driver terminal-related information received by the vehicle apparatus-side communicator.

14. A vehicular portable device associated with an in-vehicle apparatus mounted to a vehicle used by a plurality of users, the vehicular portable device comprising:
a first communicator that communicates with the in-vehicle apparatus;
a second communicator that performs a short range wireless communication with portable terminals carried by the users;

a received signal strength detector that detects received signal strength of signals received by the second communicator from the portable terminals; and a driver terminal determiner that, based on the received signal strength detected by the received signal strength detector, determines a driver terminal which is the portable terminal carried by the user acting as a driver, wherein the received signal strength detector detects the received signal strength of the signals received from the portable terminals at a plurality of time points, and wherein the driver terminal determiner determines the portable terminal providing a smallest degree of change of the received signal strength detected multiple times as the driver terminal.

* * * * *